Figure 6:
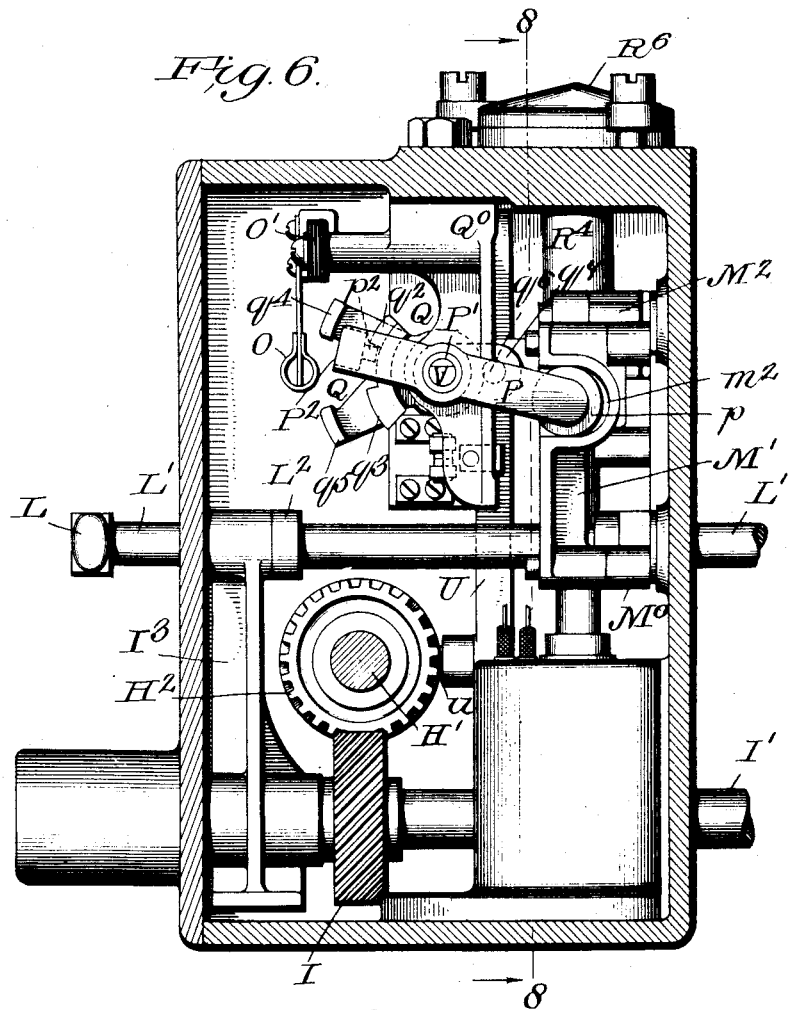

No. 871,804. PATENTED NOV. 26, 1907.
R. H. KIRK.
APPARATUS FOR ELECTRICALLY OPERATING WATER TIGHT BULKHEAD DOORS.
APPLICATION FILED APR. 22, 1905.
12 SHEETS—SHEET 1.
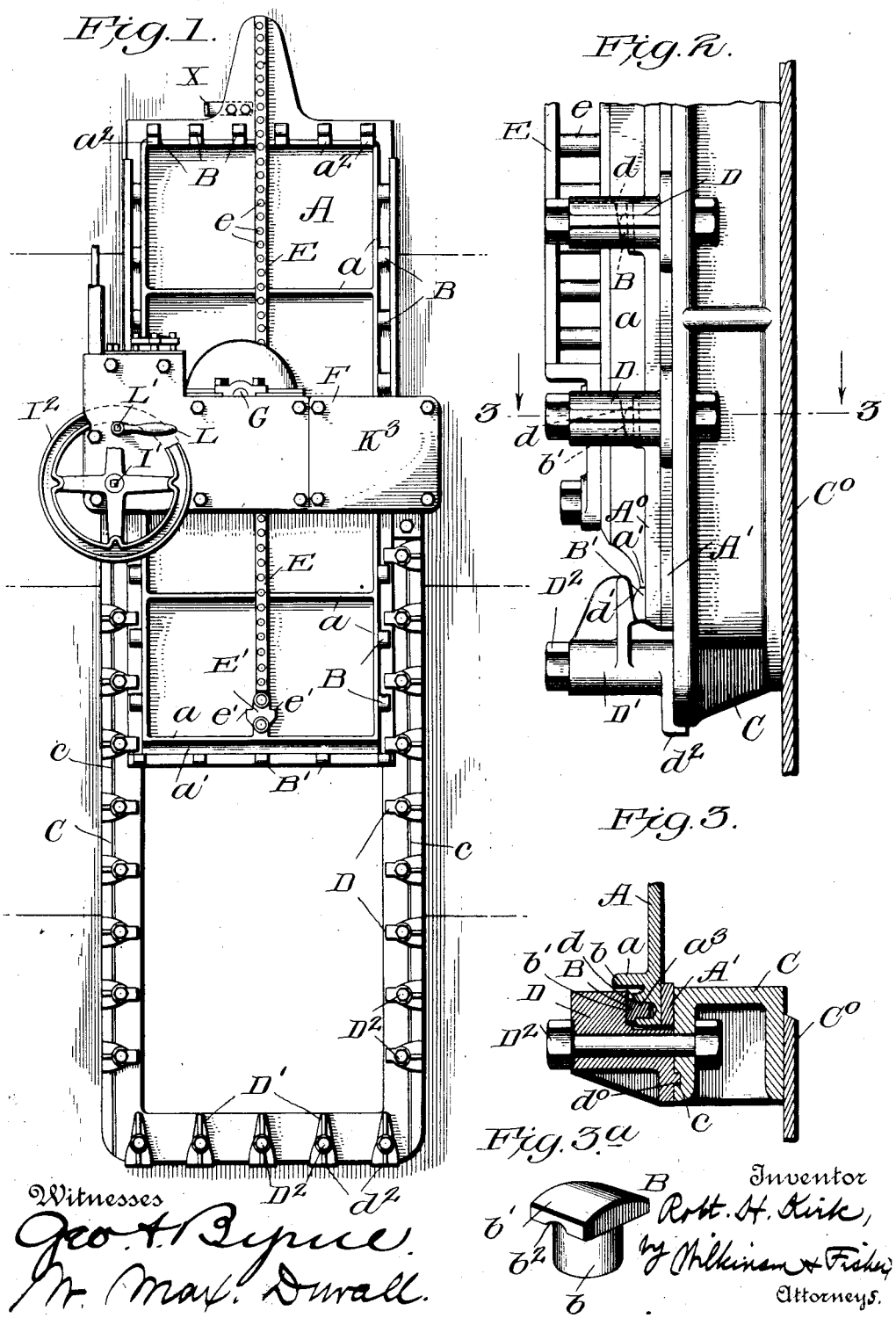

No. 871,804. PATENTED NOV. 26, 1907.
R. H. KIRK.
APPARATUS FOR ELECTRICALLY OPERATING WATER TIGHT BULKHEAD DOORS.
APPLICATION FILED APR. 22, 1905.
12 SHEETS—SHEET 2.
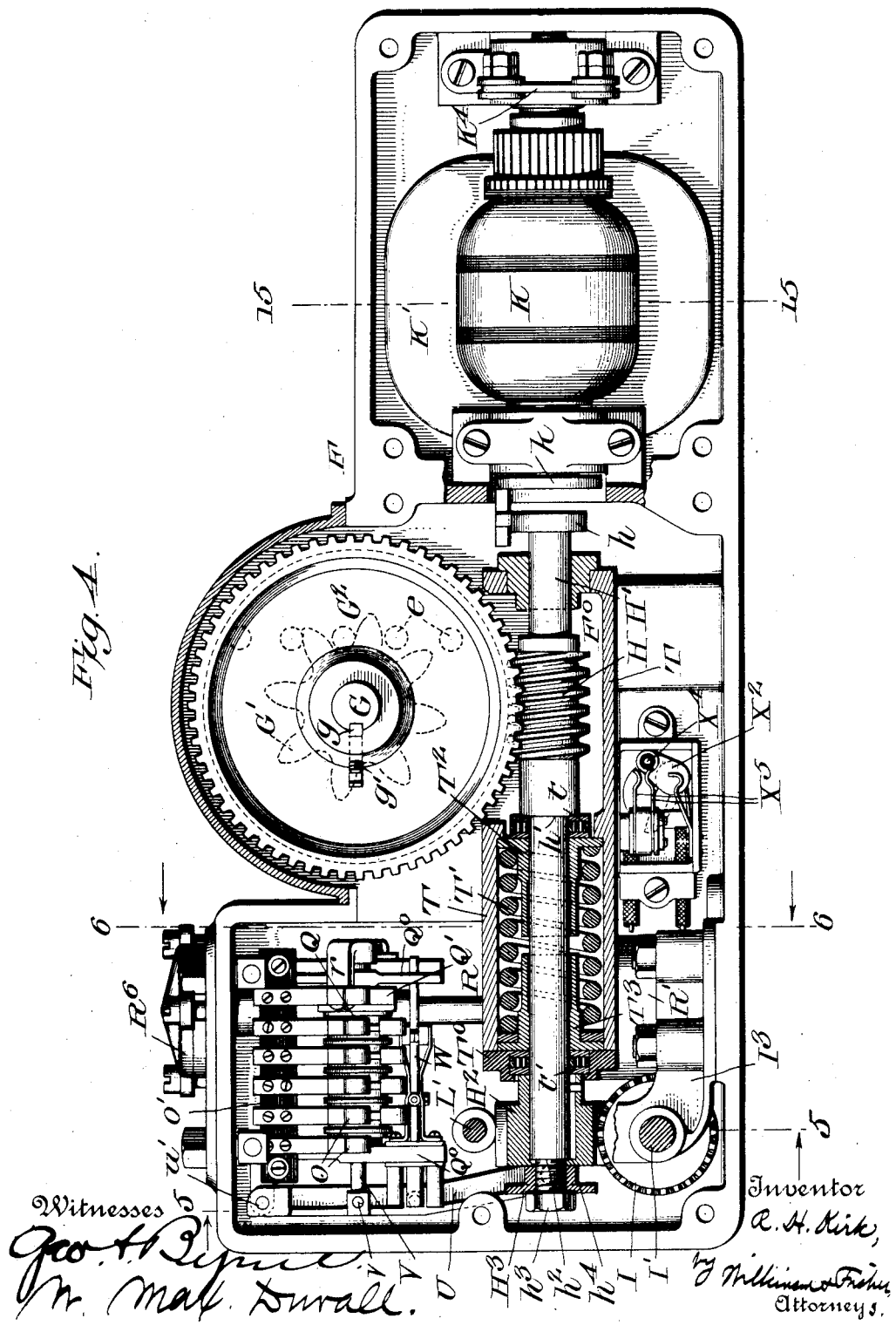

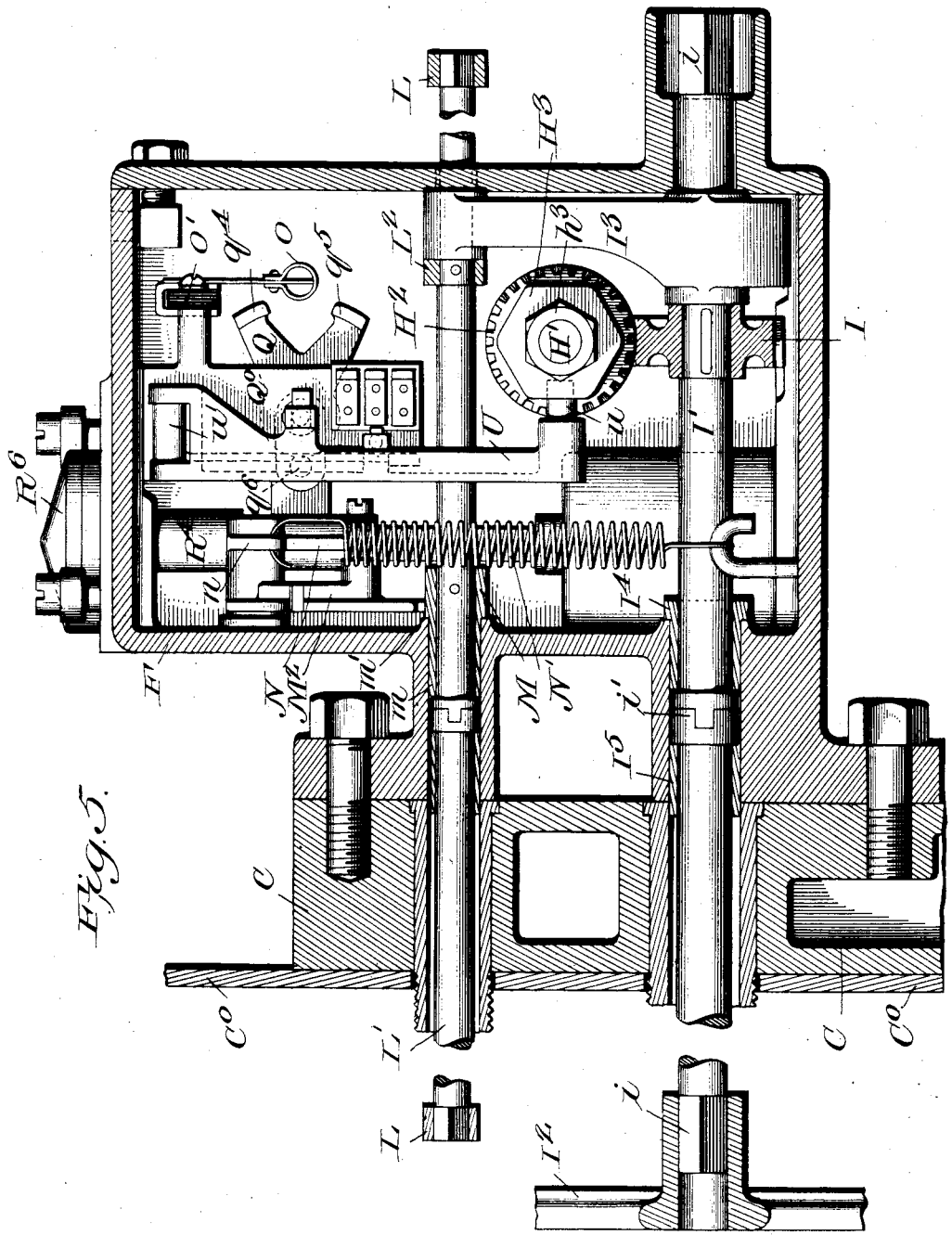

No. 871,804. PATENTED NOV. 26, 1907.
R. H. KIRK.
APPARATUS FOR ELECTRICALLY OPERATING WATER TIGHT BULKHEAD DOORS.
APPLICATION FILED APR. 22, 1905.

12 SHEETS—SHEET 4.

Witnesses
Geo. H. Byrne.
W. Max. Durall.

Inventor
Robert H. Kirk,
by Wilkinson & Fisher,
Attorneys.

No. 871,804. PATENTED NOV. 26, 1907.
R. H. KIRK.
APPARATUS FOR ELECTRICALLY OPERATING WATER TIGHT BULKHEAD DOORS.
APPLICATION FILED APR. 22, 1905.
12 SHEETS—SHEET 5.
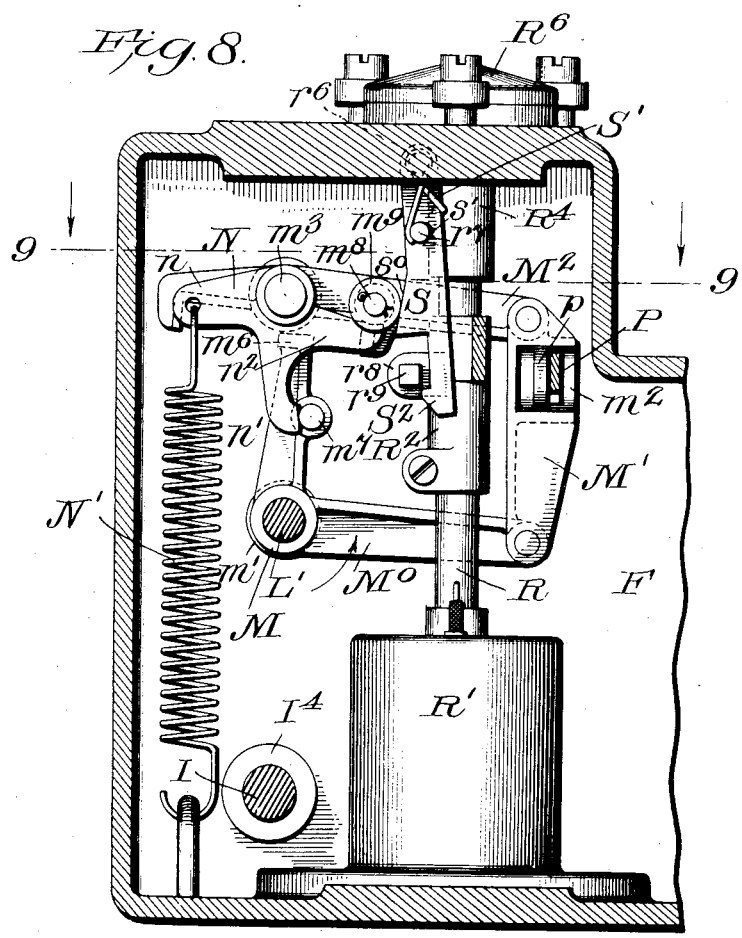
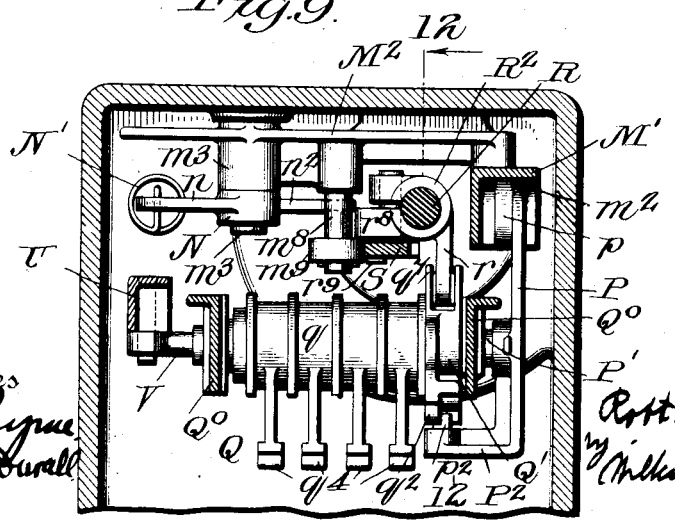

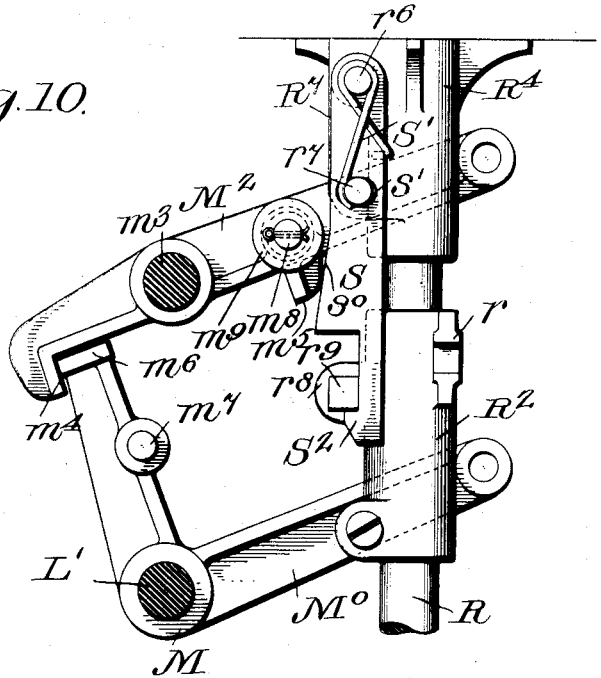

No. 871,804. PATENTED NOV. 26, 1907.
R. H. KIRK.
APPARATUS FOR ELECTRICALLY OPERATING WATER TIGHT BULKHEAD DOORS.
APPLICATION FILED APR. 22, 1905.
12 SHEETS—SHEET 7.

No. 871,804.  
PATENTED NOV. 26, 1907.  
R. H. KIRK.  
APPARATUS FOR ELECTRICALLY OPERATING WATER TIGHT BULKHEAD DOORS.  
APPLICATION FILED APR. 22, 1905.  
12 SHEETS—SHEET 8.
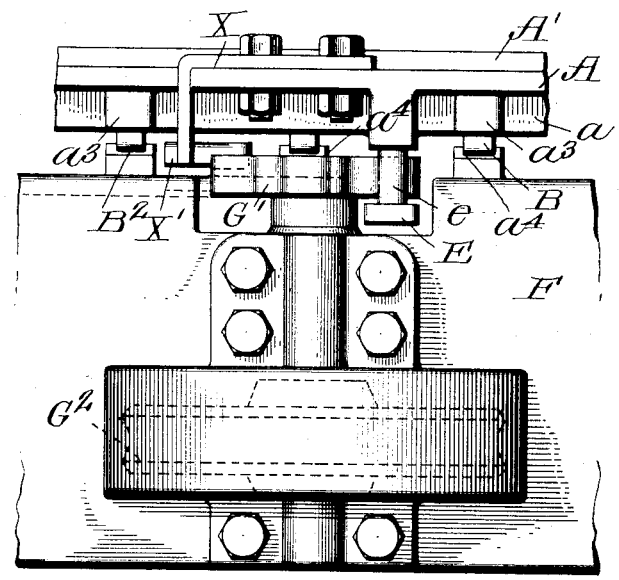
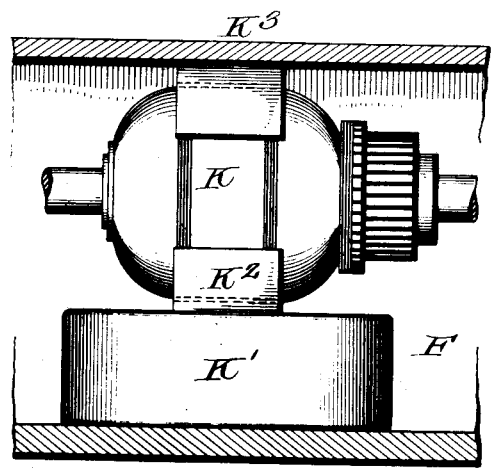
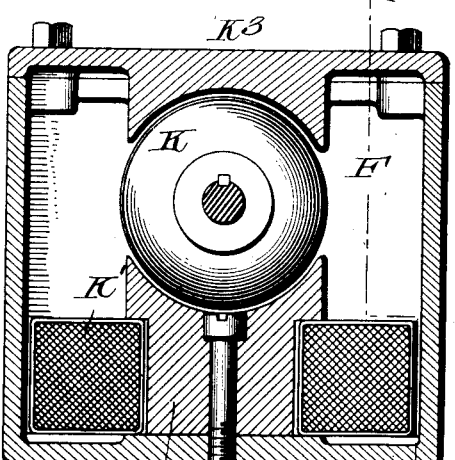

No. 871,804. PATENTED NOV. 26, 1907.
R. H. KIRK.
APPARATUS FOR ELECTRICALLY OPERATING WATER TIGHT BULKHEAD DOORS.
APPLICATION FILED APR. 22, 1905.
12 SHEETS—SHEET 9.
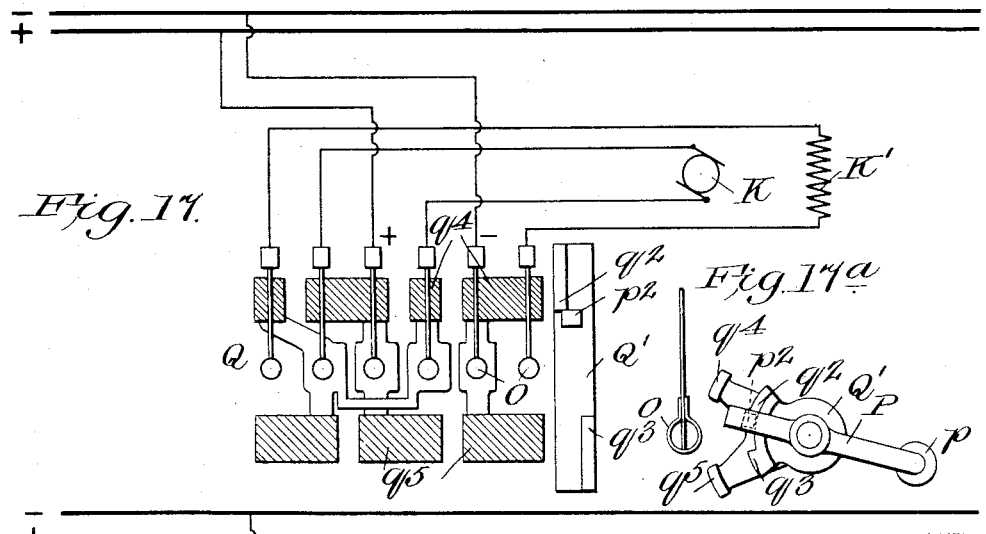
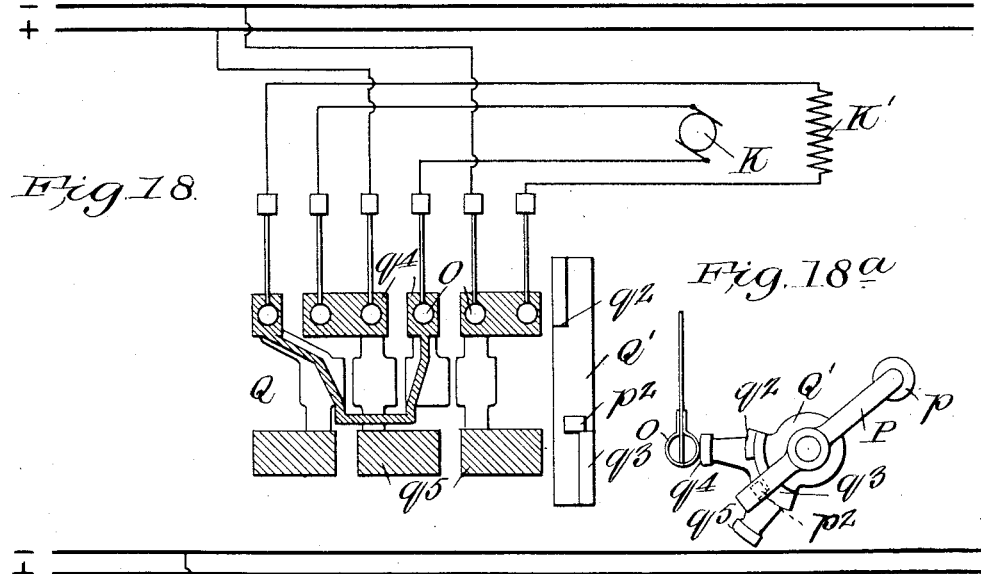
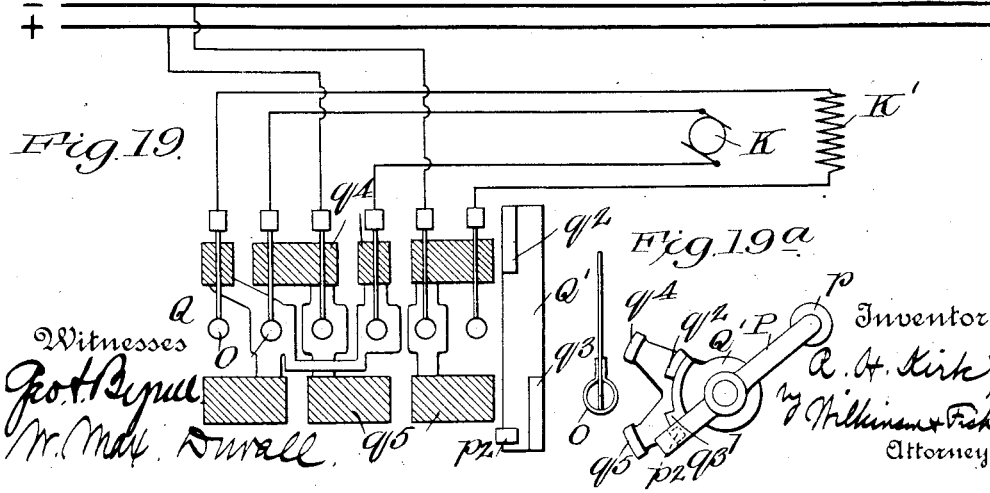

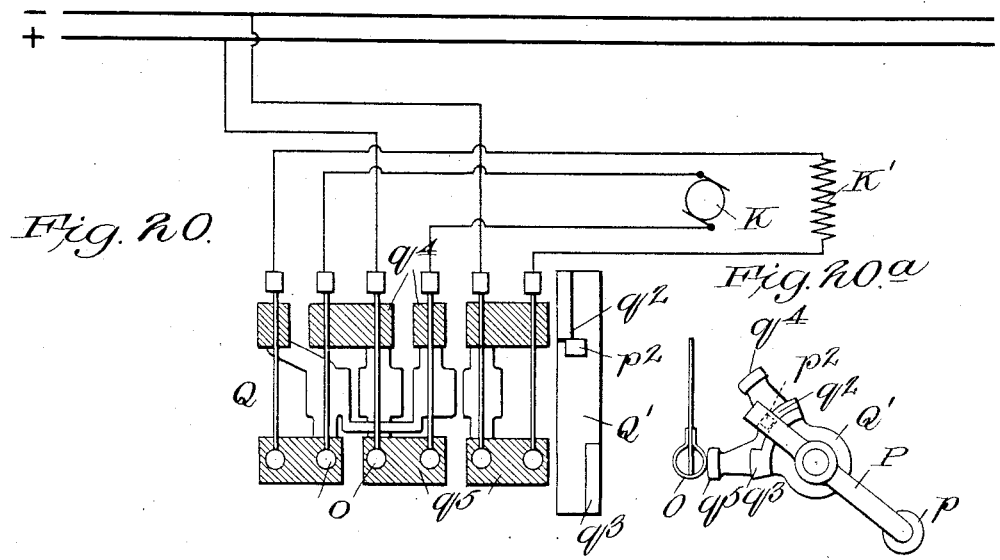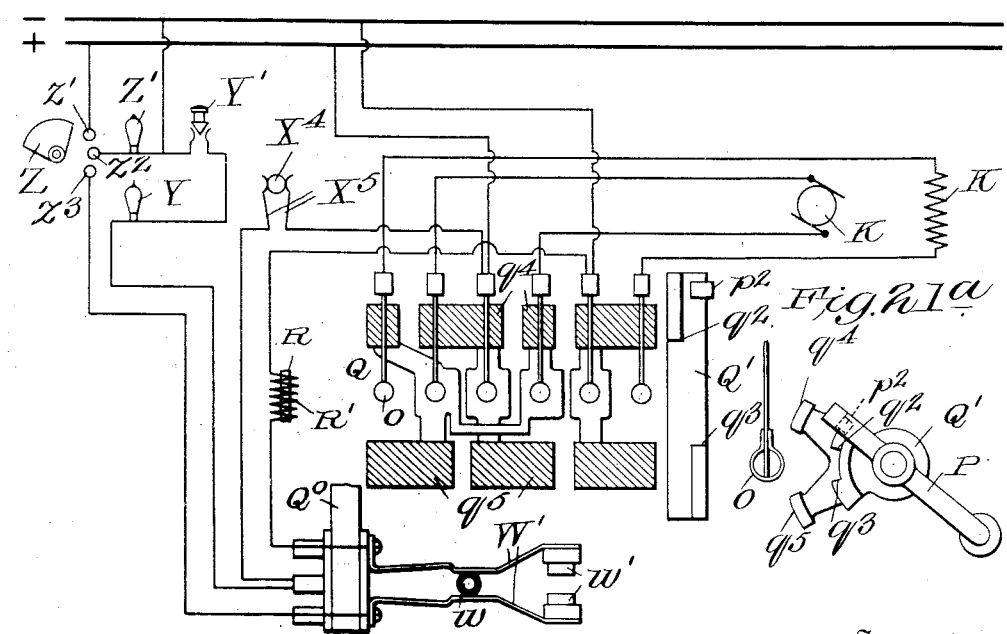

No. 871,804.

PATENTED NOV. 26, 1907.

R. H. KIRK.

APPARATUS FOR ELECTRICALLY OPERATING WATER TIGHT BULKHEAD DOORS.

APPLICATION FILED APR. 22, 1905.

12 SHEETS—SHEET 11.

Witnesses

Inventor
Robert H. Kirk
by Wilkinson & Fisher,
Attorneys

No. 871,804. PATENTED NOV. 26, 1907.
R. H. KIRK.
APPARATUS FOR ELECTRICALLY OPERATING WATER TIGHT BULKHEAD DOORS.
APPLICATION FILED APR. 22, 1905.
12 SHEETS—SHEET 12.

Witnesses
Geo. A. Byrne
W. May. Durall

Inventor
Robert H. Kirk,
by Wilkinson & Fisher,
Attorneys

UNITED STATES PATENT OFFICE.

ROBERT H. KIRK, OF CLEVELAND, OHIO, ASSIGNOR TO THE "LONG ARM" SYSTEM COMPANY, OF CLEVELAND, OHIO, A CORPORATION OF OHIO.

APPARATUS FOR ELECTRICALLY OPERATING WATER-TIGHT BULKHEAD-DOORS.

No. 871,804.  Specification of Letters Patent.  Patented Nov. 26, 1907.

Application filed April 22, 1905. Serial No. 256,975.

*To all whom it may concern:*

Be it known that I, ROBERT H. KIRK, a citizen of the United States, residing at Cleveland, in the county of Cuyahoga, and State of Ohio, have invented certain new and useful Improvements in Apparatus for Electrically Operating Water-Tight Bulkhead-Doors; and I do hereby declare the following to be a full, clear, and exact description of the invention, such as will enable others skilled in the art to which it appertains to make and use the same.

My invention relates to improvements in apparatus for the electrical operation of bulkhead doors and hatches aboard ship, and it relates more especially to certain improvements on the well known "long arm" system as installed in the United States Navy and as illustrated in the U. S. patents to George H. Hill No. 650,973, granted June 5, 1900, to W. B. Cowles No. 729,280, granted May 26, 1903, to W. B. Cowles No. 743,252, granted November 3, 1903. This system as installed aboard ship requires that each such door or hatch must be capable of permitting operation on the spot by power or by hand from either side of the bulkhead or deck, and all such doors or all such hatches are to be capable of being closed by power, simultaneously, from an emergency station. During any period of simultaneous or emergency closing, full control must be maintained for opening any individual door or hatch on the spot, either by power or by hand, from either side of the bulkhead or deck, and after any individual opening during such period the emergency closing must repeat itself automatically. Means must be adopted to indicate continuously at the emergency station during every emergency period when each door and hatch is shut and locked. The hatches and doors must form independent groups for working at the emergency station. These results are accomplished by the apparatus that will be hereinafter described.

Reference is had to the accompanying drawings in which the same parts are indicated by the same letters throughout the several views.

Figure 7:
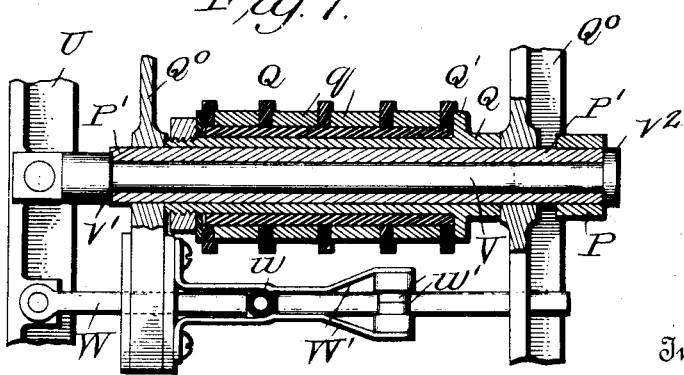
Figure 12:
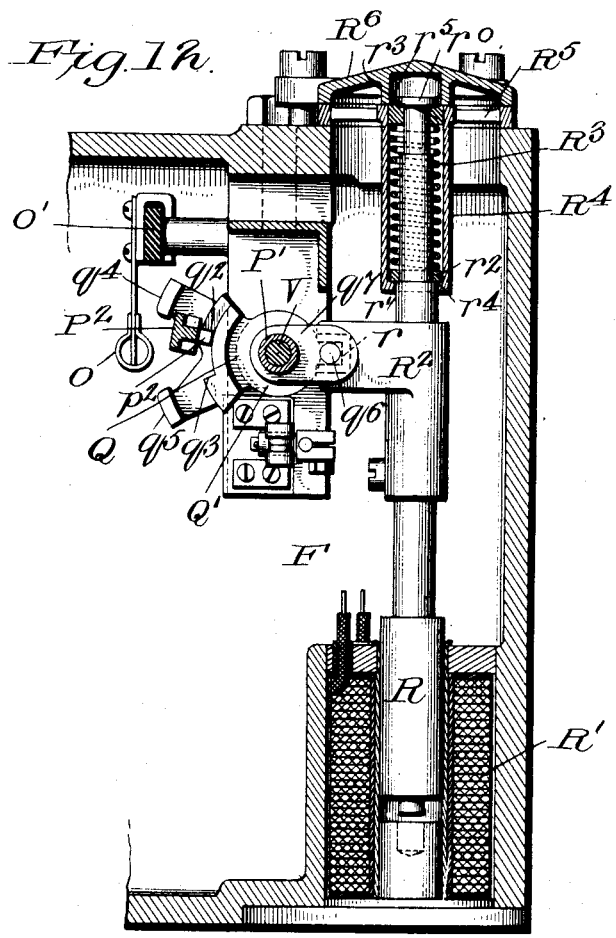
Figure 13:
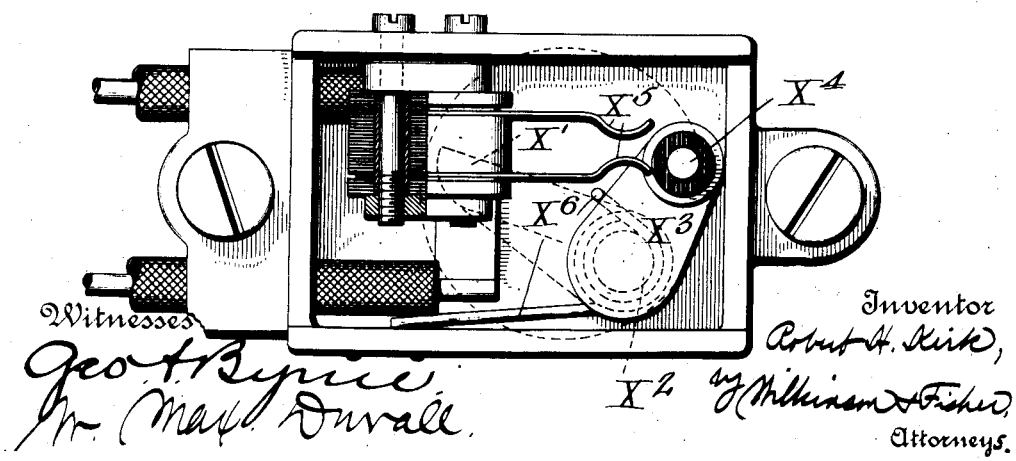

Figure 1 is a front elevation of a vertically sliding bulkhead door, with the operating parts constructed according to my invention, the door being shown partly open. Fig. 2 shows a section through the bulkhead, and illustrates the lower portion of the door when the door is in the closed position, this view is on an enlarged scale. Fig. 3 shows a section along the line 3—3 of Fig. 2 and looking down, and Fig. 3ª is a perspective view showing on a still further enlarged scale, one of the removable studs or buttons used in effecting the tightening of the door. Fig. 4 is a front elevation, on an enlarged scale, of the power box attached to the framework of the door, the front cover being removed and parts being shown in section. Fig. 5 shows a section through the power box on the line 5—5 of Fig. 4, looking in the direction of the arrows, the cover of the power box being on, this view is on a still further enlarged scale from that shown in Fig. 4. Fig. 6 shows a section along the line 6—6 of Fig. 4 and looking in the direction of the arrows, the scale being the same as that of Fig. 5, and the cover of the power box being on. Fig. 7 is an enlarged longitudinal sectional view of the controller drum, parts being shown in elevation. Fig. 8 shows a section along the line 8—8 of Fig. 6 and looking in the direction of the arrows. Fig. 9 shows a section along the line 9—9 of Fig. 8 and looking down. Figs. 10 and 11 are details on a somewhat larger scale than Fig. 8, showing the operation of the interlocking catch for rendering it possible to operate the door either locally or from a distance, and to take away locally the control from a distance. Fig. 12 is a section on the line 12—12 of Fig. 9, looking in the direction of the arrows, it being a similar section to that shown in Fig. 6, but being taken further from the motor and through parts that are hidden in Fig. 4. Fig. 13 is an enlarged view of the contact box for closing the circuit for indicating at the emergency station that the door is closed. Fig. 14 is a plan view of a portion of the door plate, and the power box, omitting the bulkhead and the door frame, and shows the rack and pin wheel and the operation of the contact box from the door plate. Fig. 15 is a section through the power box along the line 15—15 of Fig. 4, and shows the field magnet and winding in section, and also shows the armature shaft in section, but shows the armature windings in end elevation. Fig. 16 shows a section along the line 16—16 of Fig. 15 and looking in the direction of the arrows. Figs. 17 to 23ª are diagrams illustrative of the electric circuits and the means for completing the same, and show the various movements of the controller and operating parts.

Figure 22:
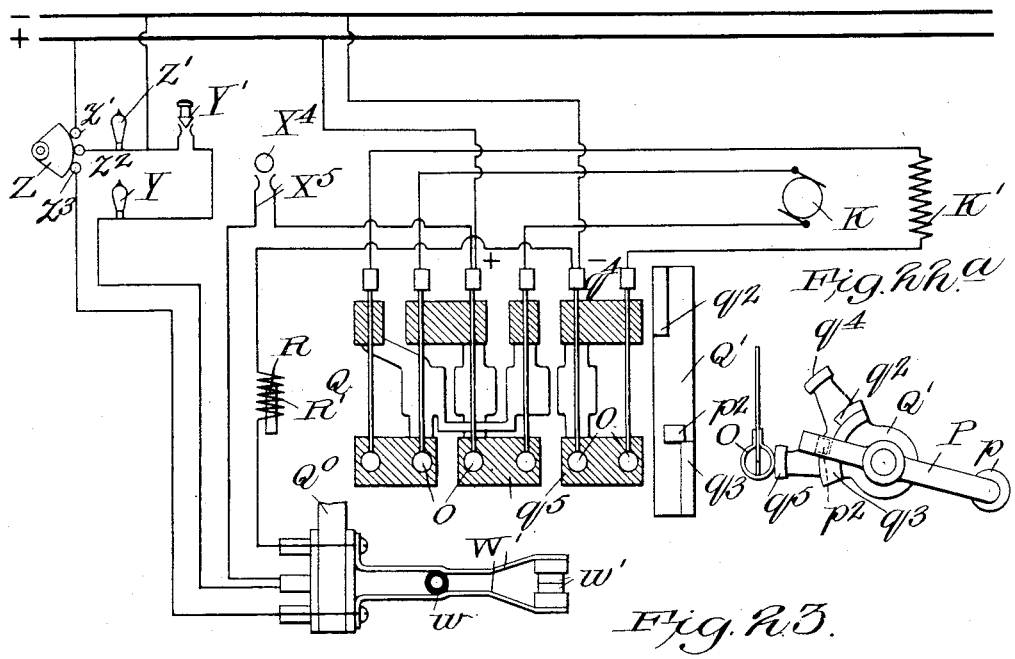
Figure 23:
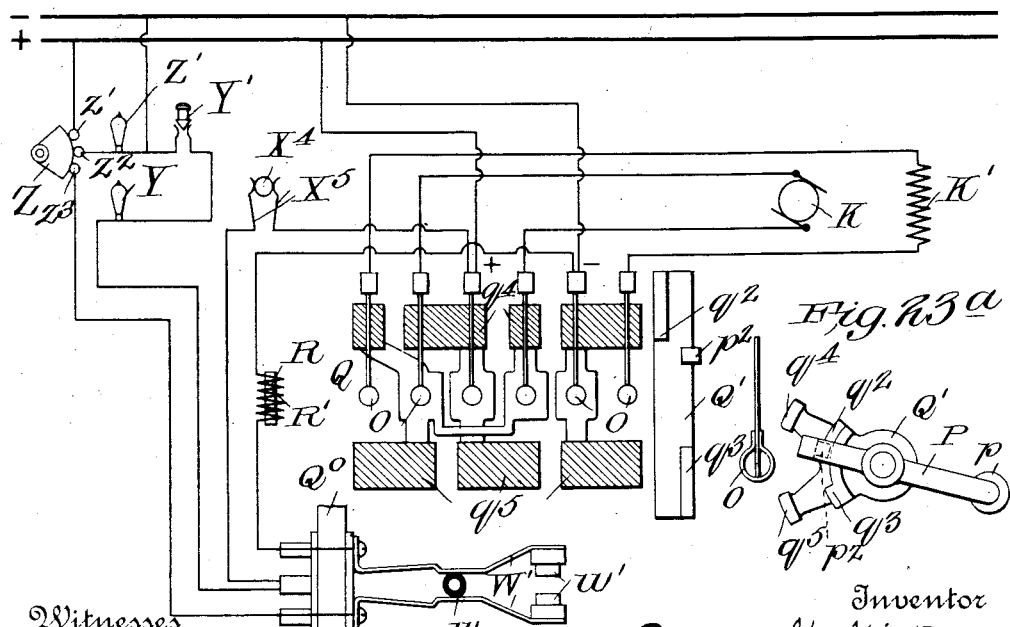
Figure 24:
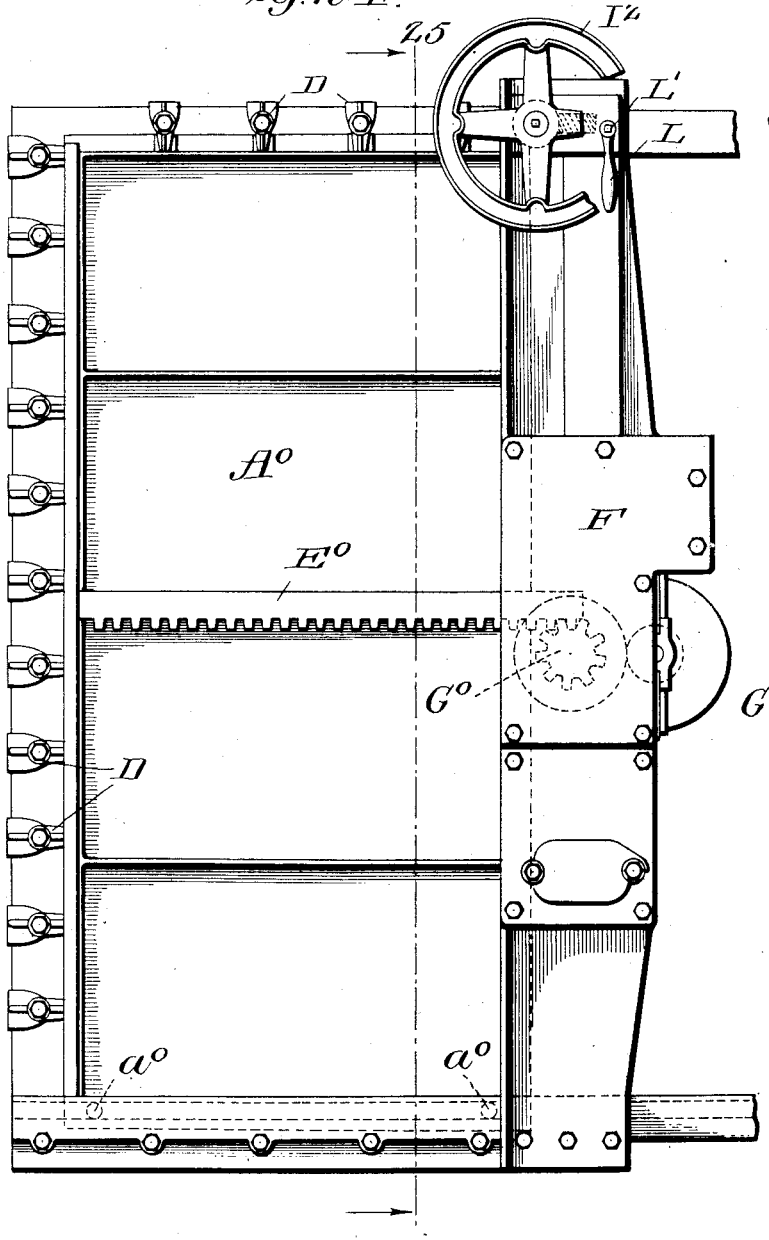
Figure 25:
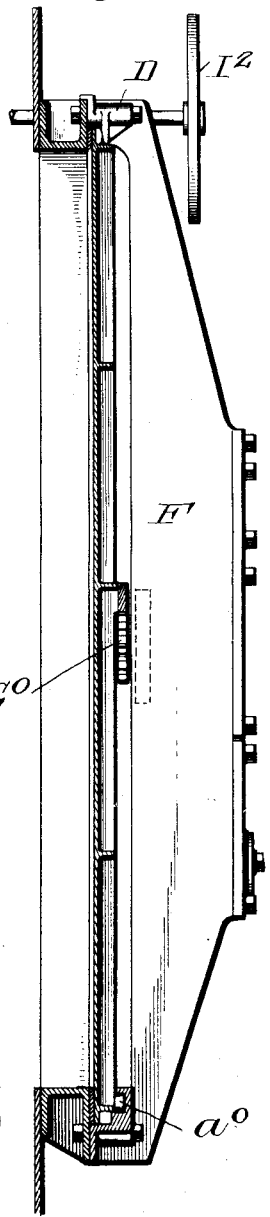

Referring specifically to these figures, Fig. 17 shows a development of the conducting segments of the controller drum and also of the flange of the controller drum with the electrical connections through the motor in the position assumed when the door is partly open. Fig. 17$^a$ shows diagrammatically the operation of the trigger and contact segments on the drum, the parts being in the same position as in Fig. 17. Figs. 18 and 18$^a$ are similar diagrams to those shown in Figs. 17 and 17$^a$, but illustrate the parts in the position when the door is being opened. Figs. 19 and 19$^a$ are similar diagrams to those shown in Fig. 17, except that the door has been fully opened, but the controller handle has not been released but is still maintained in the open position. Figs. 20 and 20$^a$ are similar diagrams illustrating the parts in the position that they assume when the door is being closed by the operation of the controller handle. Fig. 21 is a similar diagram to that shown in Figs. 17, 18, 19 and 20, except that it is intended to show the operation of the parts at emergency station, and the parts at the door are in the position assumed when the door is closed and locked, but the controller handle has not been released and is held down by the operator at the door. Figs. 22 and 22$^a$ show similar diagrams to those shown in Figs. 21 and 21$^a$, except that the door is being closed from the distant point by the emergency action. Figs. 23 and 23$^a$ show similar diagrams but with the door in the closed position after having been closed from the emergency or distant station. Fig. 24 shows a front elevation of a horizontal sliding door operated according to my invention, the operative parts being generally similar to those illustrated in the other figures, and Fig. 25 shows a section through the bulkhead, showing the side elevation of the door shown in Fig. 24.

Referring first to Figs. 1 to 3$^a$, these are intended to show more especially the movement of the door and the means of tightening it on its seat when it reaches the closed position.

A represents the door plate, which is provided with the usual strengthening ribs $a$, and has its opposite face plane and provided with seating strips A' about its four edges for making a tighter joint.

B represents one of a plurality of buttons which are intended to coöperate with the tightening wedges. These buttons are provided with dowel pins $b$, which project into corresponding sockets $a^3$ in the edges of the door plate. These buttons are provided with polygonal tops, which are preferably curved on their outer face, as at $b'$, and may be provided with recesses $b^2$ for convenience of removal, when desired. These dowels $b$ fit snugly in the sockets, and the buttons may be lined up by shims or washers placed beneath the heads, as may be desired.

C represents the door frame, which is secured to the bulkhead C$^0$ in any convenient way. This frame is preferably made of channel beams, such as shown in Fig. 3, which have secured thereto a plurality of wedge brackets D attached to the door frame by suitable bolts and nuts D$^2$. The wedge brackets D' at the bottom of the door differ slightly from those at the sides in that those at the sides are "cross-wedge" brackets, in which the wedge runs crosswise, while the brackets at the bottom of the door are "end-wedge" brackets, in which the wedge runs endwise. The said brackets are preferably provided with tenons $d^0$ which fit in the sockets $c$ in the door frame. For convenience of manufacture these sockets $c$ are made in the form of a continuous groove in the door frame, as indicated in Figs. 1 and 3. The wedge faces $d$, shown in dotted lines in Fig. 2, engage the buttons B, as is shown in Figs. 2 and 3. The side buttons B have one of their angular faces abutting against a rib $a$, and are thus held against turning. The bottom buttons B' abut against a shoulder $a'$, as shown in Figs. 1 and 3, and are thus held against turning. The top buttons B$^2$ have one face abutting against lugs $a^2$, and these buttons engage on wedges on back of the power box, as indicated at $a^4$ in Fig. 14.

The bottom brackets D' are provided with wedge faces $d'$ engaging the buttons B' and with hooks $d^2$, which project beneath the bottom sill of the door frame. Thus it will be seen that when the door is in the closed position there will be a series of rounded buttons engaging wedge faces located all around the four sides of the door frame, so that the door will be wedged firmly on its seat, but will be released and free to slide by a slight upward movement in the beginning of the operation of opening the door.

The door plate is provided with a pin rack E having a number of pins $e$, shown in Fig. 1, and also in Fig. 14, and in dotted lines in Fig. 4, and this rack terminates in a stop piece E' having stop shoulders $e'$, which engage the power box, and thus stop the door when it reaches the fully open position. With vertically sliding doors, a pin rack is preferable to an ordinary form of rack, for the reason that such doors are often fitted to coal bunkers and have to plunge through coal, and moreover, they are fitted in parts of the ship where it is difficult to keep them clean and coal or dirt or other material is apt to clog up the rack, causing the pinion to wedge the rack away laterally, binding the door in the frame; but by having a pin rack with pin teeth projecting between the pins, the rack is automatically cleaned out every time the door is raised or lowered. Furthermore, by having the shape of the teeth of involute form with the base circle of the same diameter as the pitch circle, a construction illustrated in Fig. 4, the teeth will always deliver to the pins a straight thrust in line with the rack, and without any lateral wedging effect, and when the pins wear, as they will in use, the thrust will be still straight in the line with the rack.

F represents the power box, which contains the electric motor and gearing and other operating mechanism, which will be described in detail later.

G represents a shaft which is journaled in the power box and carries a pin wheel G' meshing with the pins $e$ of the rack E. This shaft has secured to it, as by means of the key $g$ and set screw $g'$, a worm wheel $G^2$, which meshes with the worm H on the worm shaft H', which worm shaft may be turned either by hand or by electricity, as will be hereinafter described. The worm H is mounted in a casing T, rigidly held in the power box, part of which casing is cut away to receive the worm wheel, but the lower portion of the casing is made tight so as to enable the entire casing to be filled with oil. This diminishes friction and keeps the worm, worm wheel, and automatic cut out attachment, hereinafter to be described, filled with oil. The hand gear turning this worm shaft comprises the spiral gear $H^2$ fast on the worm shaft, which meshes with a spiral gear I fast on the hand shaft I', which hand shaft has squared ends $i$ for the reception of the hand wheel $I^2$. This shaft projects through the bulkhead so that a hand wheel may be applied at either side of the bulkhead and thus the hand shaft may be turned from either side of the bulkhead by hand, as may be desired. For convenience of assembly this hand shaft is made of two parts coupled together as at $i'$, see Fig. 5, one of the parts being journaled in bearings $I^3$, $I^4$, the other part carrying a sleeve $I^5$ fitting in bearings in the power box, as shown in Fig. 5.

One end of the worm shaft is coupled to the electric motor with a coupling which permits of longitudinal movement of the worm shaft, such, for instance, as the coupling illustrated at $h$ and $k$ in Fig. 4. The armature of the electric motor K, see Figs. 4, 15, and 16, is mounted between the excited pole piece $K^2$ wound with the winding K', and the consequent pole piece $K^3$, which latter is preferably made integral with that part of the cover of the power box. This insures compactness and ready accessibility of the parts. The brushes, not shown, may be of any suitable type, and the brush holders may be secured to the bearing $K^4$, shown in Fig. 4.

The power box incloses a controller Q, through whose instrumentality electrical operation of the door is effected, and this electrical operation may be either controlled locally by hand, or from the emergency station through mechanism that will now be described.

Referring first to the operation of the controller locally at the door and from either side of the bulkhead, I provide a control shaft L' carrying handles at either side of the bulkhead L, which control shaft, for convenience of assembly, is preferably made in two parts coupled together, similarly to the hand shaft I'. This control shaft is journaled in bearings $I^3$, and also in the power box. It carries a set collar $L^2$ and a sleeve M projecting as at $m$ into the bearing in the power box and having a shoulder $m'$ which bears against the corresponding shoulder of the power box, so that by means of this shoulder $m'$ and the collar $L^2$ the control shaft is held against longitudinal movement. This sleeve M is fast to the control shaft L', as shown in Fig. 5. The sleeve M constitutes the hub of a bell crank lever $M^0$, one arm of which is connected to the link M', which is recessed at $m^2$ to receive the head $p$ of the lever P, hereinafter to be described. This link M' is connected to the lever $M^2$, which is pivoted on the pin $m^3$, and is provided with stops $m^4$ and $m^5$, which stops are alternately engaged by the head $m^6$ of the opposite arm of the bell crank lever $M^0$, as the control shaft reaches the limit of its rotation in reverse directions. The bell crank lever $M^0$ also carries a pin $m^7$. Pivoted on the stud $m^3$ is a three-armed lever N having arms $n$, $n'$, $n^2$. The arm $n$ is normally constrained by the spring N', see Figs. 5 and 6, which causes the arm $n'$ to normally engage the pin $m^7$, and normally causes the arm $n^2$ to engage the pin $m^8$, which is carried by the lever $M^2$. This pin $m^8$ also carries a roller $m^9$ whose function will be described later. By means of this spring N' the handles L on the control shaft are normally returned to the central position when released, the parts being then in the position shown in Fig. 8, and the effect on the controller will be hereinafter described. It will be seen that if the control shaft be turned in the direction indicated by the arrow (see Fig. 8), the stop pin $m^7$ will rock the arm $n'$ stretching the spring N'. As soon as the control handle is released the spring will snap the parts to the initial position. Whereas, if the control shaft L' be rocked in the reverse direction, the link M' will rock the lever $M^2$, causing the pin $m^8$ to rock the arm $n^2$, also stretching the spring N'; and as soon as the control handle is released the spring will again snap the parts to the initial position. So that the operation of the mechanism causes the return of the control handles to the initial position irrespective of whether they be turned for opening or closing the door.

The controller is operated from the handles L by means of the link M' through the instrumentality of the lever P fast on the sleeve P', which is journaled in the controller frame Q⁰. For convenience of assembly, this lever is provided with a rounded head $p$, which projects into the recess $m^2$ in the link M', and the lever is rocked up and down as this link is moved, through the instrumentality of the control shaft L', and handles L. This lever P carries an elbow $P^2$ carrying on its end an angular trigger or toe $p^2$, which engages one or other of the lugs $q^2$ or $q^3$ on the flange Q' of the controller drum, and thus rocks the controller drum in opposite directions for either opening or closing the door, as may be desired. Rocking the controller causes the tips $q^4$ or $q^5$ on the conducting segments $q$ of the controller to engage the contact fingers O, which are mounted on the insulating holder O' supported by the controller frame Q⁰, see Figs. 4 and 6.

The wiring connections are all omitted from the drawings, except in the diagrams, Figs. 17 to 23ᵃ.

The controller drum is held in the mid position by the apparatus, shown more clearly in Fig. 12, in which $q^7$ represents an arm carried by the controller drum provided with a stud $q^6$, which projects into a slot $r$ in the bracket $R^2$ carried by the solenoid plunger R. This plunger is free to move up and down within limits, but is normally held in the mid position by means of the centralizing spring $R^3$, mounted on the plunger rod, which spring is in the casing $R^4$ and abuts against the loose collars $r^2$ and $r^3$. The lower collar $r^2$ is limited in its downward travel by means of the shoulder $r^4$ of the casing $R^4$. The spring $R^3$ presses upwards on the collar $r^3$, which engages the cap piece $r^0$ of the plunger rod, and lifts the plunger rod upwards causing the shoulder $r'$ normally to engage the collar $r^2$, when the parts are in the normal position indicated, in Fig. 12. The collar $r^3$ also bears against a rib $r^5$ on the cap $R^6$, the spring $R^3$ being held under compression between the two collars $r^2$ and $r^3$. Now if the plunger rod be pushed downwards from any cause, this spring $R^3$ will tend to restore the parts to the initial position as soon as the force acting on the plunger is withdrawn. On the contrary, if the plunger be lifted upwards from any cause the spring $R^3$ will be compressed by the upward action of the collar $r^2$, and will tend to restore the plunger to the initial position as soon as the extraneous pressure is withdrawn, so that this spring is double acting and tends to center the plunger in the mid position, and in so doing also centers the controller in the mid position. This plunger may be operated locally from either side of the bulkhead and in either direction by means of the control handles L which operate the link M' and the lever P; or it may be operated from a distant point in one direction only by means of a solenoid R⁰ which sucks the plunger R downwards only when the emergency circuit is closed. The connections with the door are so arranged that the controller is turned for closing the door when this emergency circuit is closed, whereas the door may be either opened or closed by turning the handles L in one or the other direction, as may be required. It will thus be seen that the plunger R may be moved either through the instrumentality of the handles L, or may be moved by the action of the solenoid R⁰. In case of conflict between the two forces acting on the plunger the solenoid is arranged so that while it may be strong enough to operate the plunger and through it the controller, it will be still weak enough to have its force readily overcome by the man turning the handle at the door. Thus it will be seen that while means for closing the door only from a distance are provided, means are provided at the door whereby it may be either opened or closed electrically at will, and whereby the local operator can, when desired, take away control from the distant point.

It will be obvious that when the door reaches the fully open or closed position, or when it encounters any obstacle that the motor is unable to overcome, it is desirable to automatically cut off the current, thus not only preventing waste of current, but preventing the parts from burning out, or being otherwise injured. For this purpose I provide automatic cut out mechanism, which is similar in some respects to the automatic cut out mechanism best illustrated in Figs. 4, 5, 7 and 9, and will now be described.

Referring first to Fig. 4, the worm shaft H' is provided with a shoulder $h'$, which abuts against a roller thrust bearing $t$, which in turn abuts against a sleeve $T^2$, which is loose on the worm shaft and free to slide axially inward in the case T. The corresponding sleeve $T^3$ is mounted in the other end of the casing T and abuts against the head piece T⁰. Between these sleeves $T^2$ and $T^3$ the heavy spring T' is held under compression. The shaft H' is also provided with a thrust bearing $t'$, which abuts against the sleeve $T^3$ and also against the hub of the spiral gear $H^2$, which is fast to the shaft. The gear $H^2$ has an inwardly projecting flange $h^4$, which engages the shoulder $h^2$ near the end of the worm shaft H', and this end of the worm shaft is screw threaded to receive the grooved collar $H^3$, and the lock nut $h^3$. Thus the spiral gear $H^2$ is held by its key against turning on the worm shaft, and it is also held, by the inwardly projecting flange $h^4$, and the collar $H^3$, against longitudinal movement on the shaft. U represents a lever which has a stud $u$, shown most clearly in Fig. 5, projecting into the grooved collar $H^3$, as indicated in Figs. 4 and 5. This lever is pivoted as at $u'$ to the controller frame and has connected thereto two rods V and W, as shown most clearly in Figs. 4 and 7. The lever U is rocked automatically by means of the worm gearing $G^2$ and H, which I will describe briefly. When the resistance offered to the movement of the door plate in either direction exceeds a predetermined limit, the worm wheel $G^2$ will either slow down or cease to revolve altogether, causing the worm H to screw itself axially in one direction or the other, as if the worm wheel were a fixed nut. This will cause the spring $T'$ to be compressed in one direction or the other according as the obstruction is encountered in closing or in opening the door. If the obstruction is encountered in closing the door, as when the door reaches its seat, or strikes an obstacle which it cannot overcome, such as a coal shovel or a slice bar, the spring will be compressed in one direction, rocking the lever U in that direction. On the other hand, if the obstruction is encountered in opening the door, as when the door reaches the upper limit of its travel, the spring $T'$ will be compressed in the reverse direction, rocking the lever U in the reverse direction. This rocking of the lever U in opposite directions effects the automatic cut off of the current applied to the motor and also automatically cuts off the current applied to the solenoid. This cutting off of the current from the motor prevents any waste of current passing through the motor after the door is down on its seat, or after it has encountered an insuperable obstruction, and also in a large measure protects the motor against being burned out. The cutting of the current off of the solenoid also saves waste of current, and prevents undue heating up of the solenoid. These ends are accomplished as will now be described.

The rod V passes through the sleeve P (see Fig. 7), and is provided with shoulders $v'$ and $v^2$, whereby the sliding motion of this rod is transmitted to the said sleeve, and since this sleeve has the lever P fast thereon, the sliding motion of this sleeve also imparts a bodily sliding motion to the lever P in the direction parallel to its pivot. This lever P slides in the direction of the axis of the sleeve $P'$ as directed by the motion of the worm H, as just described, and also has a rocking motion about the same axis caused by the motion of the link $M'$, which is operated by the control lever L, these two movements being a sliding movement on its axis, and a rocking movement about its axis, and the one does not interfere with the other in any way.

It will be noted that the curved bearing $m^2$ for the rounded head $p$ of the lever P is elongated somewhat as shown in Figs. 8 and 9 to permit this bearing to continue in engagement, although the lever P may have moved in the direction of the axis of its pivot.

The rocking movement of the lever causes the trigger $p^2$ to engage with one or the other of the lugs $q^2$ or $q^3$ on the flange $Q'$ of the drum of the controller; but the sliding movement of the lever causes this trigger to become disengaged from one or the other of these lugs according to the direction of the said sliding motion, and thus releases the controller drum from being held by the said lever P when the load on the gearing becomes excessive, which release of the trigger permits the spring $R^3$ to return the plunger R to the initial position shown in Fig. 12, which return of the plunger restores the controller drum to the initial position in which the current is cut off from the motor. This is illustrated diagrammatically in the diagrams, Figs. 17 to $23^a$, which will be hereinafter described.

Since it will be undesirable to have the current continue to flow through the solenoid $R^0$ and the motor, after the door has closed and locked, or after it has encountered an insuperable obstruction, the rod W and the switch shown in Figs. 4 and 7 and illustrated in the diagrams in Figs. 21 to 23 are provided. This rod W is moved by the rocking of the lever U, and carries an insulating wedge $w$ which separates the springs $W'$ opening the contacts $w'$ and breaking the circuit through the solenoid. This operates only when the rod W is moved to the right in Fig. 7 and not when moved to the left. In other words, the solenoid is only cut out when the obstruction is encountered when closing the door, and not when it is encountered when opening the door. Thus, if the door is arrested in closing by any obstacle, it may be opened either by the hand gear, or locally electrically by means of the handle $L'$, and after being opened it will close again automatically until it either meets the same obstruction or until that obstruction has been removed, in which case the door will close automatically. The most important feature of having this solenoid circuit broken by the action of the automatic cut-out mechanism, is that should the obstruction be removed, either by hand or by being washed away, the automatic cut-out mechanism will be restored to the initial position, again closing the solenoid circuit and allowing the door to complete its closure automatically.

In order that indication may be made at the central station when the door is closed, a signal circuit is closed by mechanism illustrated in Figs. 1, 13 and 14, in which X represents an arm carried by the door plate which strikes a crank $X'$, pivoted on a shaft $X^2$, which shaft carries another crank $X^3$, provided with an insulated conducting pin $X^4$ which is normally held out of engagement with the spring contacts $X^5$ by means of the torsional spring $X^6$ on the shaft $X^2$. When the door nears the completion of its closure, the arm X strikes the crank $X'$, rocking the shaft $X^2$, and just as the closure of the door is completed, the conducting pin $X^4$ contacts with the spring contact pieces $X^5$, completing the lamp circuit. Since it may not be desirable to have the lamp circuit always completed when the door is closed, I provide a button at the emergency station for making or breaking the circuit by hand at that point, as will be shown in the diagrams, which will now be described.

In Figs. 17, 18, 19, 20, 21, 22 and 23, the conducting tips $q^4$ and $q^5$ of the controller segments are shown as developed, as is also the flange $Q'$ which carries the lugs $q^2$ and $q^3$. In Figs. $17^a$, $18^a$, $19^a$, $20^a$, $21^a$, $22^a$, and $23^a$, these parts are shown in end elevation and in proper relation.

Referring first to Figs. 17 and $17^a$, the controller drum is shown in the mid position when the contact fingers are not in engagement with the segments and when the current of the motor is cut off. The trigger $p^2$ is shown as adjacent to the lug $q^2$ which indicates that the lever P is in the normal position, or in other words, that the handles L are in the mid position. The fact that the trigger $p^2$ is in a central position with regard to its axial motion, shows that the door is not in the closed or locked position, or that it has not reached an insuperable obstruction in either closing or opening, for in such case this trigger will have moved axially to clear one or the other of these lugs. This will be brought out more fully later.

Referring now to Figs. 18 and $18^a$, these show the parts in the position for opening the door by means of the lever P, which as before explained is rotated only by the handles L. It will be noted that the trigger $p^2$ is now engaging with the lug $q^3$, and is holding the drum so that the opening segments $q^4$ make contact with the fingers O. At this stage, the handle L operating through the lever P is holding the drum down against the action of the centralizing spring $R^3$, see Fig. 10. If this handle be released, the lever P and the controller drum will be snapped back to the position indicated in Figs. 17 and $17^a$.

In Figs. 19 and $19^a$, the lever P is shown as still maintained in the position for opening the door, but the door having completed the opening operation and the worm having moved axially, has imparted a sliding movement to the lever P, causing the trigger $p^2$ to clear the lug $q^3$ which will allow the centralizing spring $R^3$ to snap the controller back to the initial position shown in Fig. 17; and if now the handle L be released, the spring $N'$ will restore the lever P to the initial position shown in Fig. 17.

Figs. 20 and $20^a$ illustrate the parts in the position occupied when the door is being closed by the local operater at the handle L. In these figures, it will be seen that the trigger $p^2$ engaging with the lug $q^2$ has rocked the controller drum, causing the fingers O to contact with the tips $q^5$. This will complete the circuit through the motor for closing the door. Now when the door reaches its closed and locked position, the worm is moved axially, causing the trigger $p^2$ to be pushed from under the lug $q^2$, as shown in Figs. 21 and $21^a$, at which time the centralizing spring $R^3$ will snap the drum back to the initial position shown in Figs. 17 and 21. In this diagram, it will be noted that the conducting pin $X^4$ shown in Fig. 13 and to the left of Fig. 21, will complete the circuit through the contacts $X^5$, causing the lamp Y to glow, provided the push button $Y'$ is pushed in. This lamp Y and push button $Y'$ are located at the emergency station, and the push button is provided merely to prevent the lamp from glowing continuously whenever the door is closed, but at the same time to permit the operator at the emergency station to ascertain whether the lamp will glow or not when he desires.

It will be noted that in Fig. 21, the emergency switch represented at Z does not make contact with the points $z'$, $z^2$ and $z^3$, the emergency control not then being in use.

The operation of these parts in closing the door through the emergency operation will be described with reference to Figs. 22 to $22^a$.

Figs. 22 and $22^a$ show the door in the act of closing by the emergency. Referring first to the emergency station, at the upper left hand corner of the figure, Z represents the emergency switch which is turned to make contact with the points $z'$, $z^2$ and $z^3$. When in the position shown in Fig. 22, the current will flow from the positive main through the contacts $z'$ and $z^2$, and the red lamp $Z'$ back to the negative main. This will cause the red lamp to glow, and will indicate at the emergency station that the emergency current is on. The current will also flow from the positive main to the contact $z'$ to the contact $z^3$, and thence passing through the springs $W'$ and contacts $w'$, it will pass through the solenoid coils $R'$, and will return to the negative main. This will cause the solenoid to suck the plunger R downwards, rocking the controller drum against the action of the centralizing spring $R^3$, and bringing the closing segments $q^5$ of the drum into contact with the fingers O. The trigger $p^2$ performs no function whatever in this operation by emergency, and that is the reason why a sufficient clearance space is allowed between the lugs $q^2$ and $q^3$ for the controller to be rocked by the emergency action, as just described, without interfering in any way with the position of the lever P and of the controller handles for operating the same. Thus if the controller handles should stick for any cause, or be held in the mid position, the emergency action would still operate the door. It will be noted that when the parts are in the position shown in Fig. 22, the circuit closer $X^4$ is out of contact with the spring $X^5$, so that pushing down the push button $Y'$ will not cause the lamp Y to glow, because the circuit through that lamp is broken, and this circuit will remain open until the door is wholly closed, the position indicated in Figs. 23 and $23^a$. When the door is fully closed and the emergency action is on, the emergency switch Z remains still in contact with the points $z'$, $z^2$ and $z^3$, and the red lamp $Z'$ continues to glow, but the insulating wedge $w$, see bottom of Fig. 23, has separated the contacts $w'$ breaking the circuit through the solenoid, which will release the plunger and will allow the spring $R^3$ to snap the controller drum back to the initial position. It will be further noted that at this time the contact pin $X^4$ will have closed the circuit through the springs $X^5$ which will complete the circuit through the lamp Y, except for the break at the push button $Y'$, and when this push button is pressed down, the circuit through the lamp Y will be completed, and this lamp will glow, so that the operator at the emergency station can tell, whenever he desires, whether the door is closed or not. It will be noted that during this action, the lever P remains in the initial position as shown in Figs. $22^a$, $23^a$ and $17^a$, thus illustrating further the entire independence of the local operation at the door and the distant or emergency operation.

It has just been described in connection with Figs. 22 to $23^a$ that the local operation through the instrumentality of the lever P and trigger $p^2$ is entirely independent of the emergency action. The requirements of the system, however, call for the taking away control from the distant point by the operator at the door, and thus it will be seen that under one condition the distant control must be dominated by the local control. Now when the emergency action is on, if the door be opened under local control, as soon as it reaches the limit of its upward travel, under the sliding action of the lever P, the trigger $p^2$ will become disengaged from the opening lug $q^3$, and the solenoid being still in operation would immediately suck the plunger down, rocking the controller drum to the position for closing the door, thus taking away control from the local operator. To prevent this, I provide the interlocking catch and mechanism illustrated most clearly in Figs. 8 to 11. S represents a catch plate pivoted on the pin $r^6$, fast to the spring casing $R^4$ and slotted as at $s'$ to allow of vibration, limited by the pin $r^7$, which projects into said slot $s'$. This plate is normally pressed forwards by the spring $S'$, tending to cause the catch $S^2$ to engage the stop $r^9$ on the arm $r^8$ projecting from the sleeve $R^2$ fast on the plunger. This plate S is provided with a cam face $s^0$ which engages with the roller $m^9$ on the pin $m^8$ fast to the lever $M^2$. This roller normally presses against the cam face $s^0$ and pushes the plate S backwards as shown in Fig. 8, so that the catch $s^2$ will be clear of the stop $r^9$. This will allow the plunger R to be moved up and down without obstruction from the catch $S^2$, and this will be the position that the parts assume whenever the handles L are in the central position. If, however, these handles are turned for opening the door, or to the position shown in Fig. 10, the roller $m^9$ will be swung away from the cam face $s^0$, and the spring $S'$ will swing the locking plate S forwards, causing the catch $S^2$ to engage beneath the stop $r^9$. When the parts are in this position, it will be impossible for the plunger rod R to be moved downward further than its mid position, shown in Fig. 8, and therefore, the solenoid is prevented from sucking down the plunger until the handle is released by the operator at the door, as shown in Fig. 11, at which time the solenoid will suck the plunger down, and the stop $r^9$ will pass clear of the catch $S^2$. Thus it will be seen that the man at the door wishing to open the same, can take away control from the emergency station, but that this control will be immediately reëstablished as soon as the man at the door lets go the control handle.

Thus I have provided an apparatus in which the door may be opened or closed by hand alone from either side of the bulkhead, in which it may be opened or closed by electricity controlled by a handle at either side of the bulkhead, and in which it may be closed from a distant point, and in which the operator at the door may take away control from the distant point. I have also provided an apparatus for signaling at the distant point when the door is closed. The apparatus also provides for automatically breaking the operating circuit from the distant point, when the door is closed or when an insuperable obstacle is encountered in closing the door. The breaking of this circuit is not necessary to the successful operation of the apparatus, and the mechanism for accomplishing the same may be omitted if desired, but it tends to economy and efficiency in the operation of the device. And, finally, I have provided automatic means for cutting off the current when an excessive load is thrown upon the gears in either opening or closing the doors.

It will be noted that the controller drum is affected from no less than four independent sources. The weakest source of power is the centralizing spring $R^3$, which restores the parts to the initial position when not acted upon by any other source of power. Stronger than the centralizing spring is the solenoid, which must be sufficiently strong to overcome the action of the centralizing spring. The third source of power is the mechanism operated by the hand lever L. This power must be stronger than the combined effects of the solenoid and of the centralizing spring, so that the controller drum may be moved against the combined effect of the solenoid and centralizing spring. The fourth source of power is the mechanism operated by the automatic cut out which throws out of action both the hand control and the solenoid control, but permits the centralizing spring to restore the parts to the initial position.

It will be noted that if the door be closing and encounters an obstacle, or reaches its seat, that the automatic cut out mechanism will take away the hand control or the solenoid control for further closing, but it will leave the hand control free to operate for opening the door, and once the door is started for opening, the automatic cut out mechanism will return to the normal position, and the solenoid control will be reëstablished, dominated of course by the hand control.

It will be obvious that while I have illustrated the invention as applied to a vertically sliding door, that it may also be applied to a horizontally sliding door, and such a door is illustrated in Figs. 24 and 25, in which the power box is arranged vertically, and in which I have shown a rack E⁰ engaging a pinion G⁰ instead of the pin rack and pin wheel used on the vertically sliding door. In this form of device, it will be more convenient to provide rollers a⁰ for the lower edge of the door A⁰, so that it may be slid more freely. The form of tighteners and the other details of the door, are substantially the same as have already been described with reference to Figs. 1 to 16.

While I have shown only the connections for operating a single door, it will be obvious that these connections might be multiplied indefinitely for groups of doors, the said connections being made at any suitable emergency station.

It will be obvious that various modifications might be made in the herein described apparatus which could be used without departing from the spirit of my invention.

Having thus described my invention, what I claim and desire to secure by Letters Patent of the United States is:—

1. An electric apparatus for the operation of watertight bulkhead doors and hatches aboard ship, comprising an electric motor and gearing driven thereby for operating the door, means for completing the circuit through said motor from a distance, hand operated mechanism for completing the circuit through said motor in either direction and dominating the distant control, a spring adapted to resist the thrust on said gearing, and mechanism operated upon the yielding of said spring for automatically cutting off the current from said motor when the load on the motor exceeds a predetermined limit, substantially as described.

2. An electric apparatus for the operation of watertight bulkhead doors and hatches aboard ship, comprising an electric motor and gearing driven thereby for operating the door, means for completing the circuit through said motor from a distance, hand operated mechanism for completing the circuit through said motor in either direction and dominating the distant control, and means for automatically cutting off the current from said motor and for breaking the circuit for the distant control when the load on the motor exceeds a predetermined limit, substantially as described.

3. An electric apparatus for the operation of watertight bulkhead doors and hatches aboard ship, comprising an electric motor and gearing driven thereby for operating the door, means for completing the circuit through said motor from a distance, hand operated mechanism for completing the circuit through said motor in either direction and dominating the distant control, a spring adapted to resist the thrust on said gearing, and mechanism operated upon the yielding of said spring for automatically cutting off the current from said motor when the load on the motor exceeds a predetermined limit, and a signal circuit for making a signal at the distant point, with means for automatically closing said signal circuit when the door reaches the closed position, substantially as described.

4. An electric apparatus for the operation of watertight bulkhead doors and hatches aboard ship, comprising an electric motor and gearing driven thereby for operating the door, means for completing the circuit through said motor from a distance, hand operated mechanism for completing the circuit through said motor in either direction and dominating the distant control, and means for automatically cutting off the current from said motor and for breaking the circuit for the distant control when the load on the motor exceeds a predetermined limit, and a signal circuit for making a signal at the distant point, with means for automatically closing said signal circuit when the door reaches the closed position, substantially as described.

5. An electric apparatus for the operation of watertight bulkhead doors and hatches aboard ship, comprising an electric motor and gearing driven thereby for operating the door, a solenoid circuit, a solenoid, and a controller operated thereby for completing the circuit through said motor from a distance, hand operated mechanism for completing the circuit through said motor in either direction and dominating the solenoid control, and means for automatically cutting off the current from said motor and for breaking the circuit through the solenoid when the load on the motor exceeds a predetermined limit, substantially as described.

6. An electric apparatus for the operation of watertight bulkhead doors and hatches aboard ship, comprising an electric motor and gearing driven thereby for operating the door, a solenoid circuit, a solenoid, and a controller operated thereby for completing the circuit through said motor from a distance, hand operated mechanism for completing the circuit through said motor in either direction and dominating the solenoid control, and means for automatically cutting off the current from said motor and for breaking the circuit through the solenoid when the load on the motor exceeds a predetermined limit, and a signal circuit for making a signal at the distant point, with means for automatically closing said signal circuit when the door reaches the closed position, substantially as described.

7. An electric apparatus for the operation of watertight bulkhead doors and hatches aboard ship, comprising an electric motor and a pin rack and pin wheel, with worm gearing for driving said pin wheel, driven by said motor for operating the door, means for completing the circuit through said motor from a distance, hand operated mechanism for completing the circuit through said motor in either direction and dominating the distant control, and means for automatically cutting off the current from said motor when the load on the motor exceeds a predetermined limit, substantially as described.

8. An electric apparatus for the operation of watertight bulkhead doors and hatches aboard ship, comprising an electric motor, a pin rack and pin wheel, with worm gearing for driving said pin wheel, driven by said motor for operating the door, means for completing the circuit through said motor from a distance, hand operated mechanism for completing the circuit through said motor in either direction and dominating the distant control, and means for automatically cutting off the current from said motor and for breaking the circuit for the distant control when the load on the motor exceeds a predetermined limit, substantially as described.

9. An electric apparatus for the operation of watertight bulkhead doors and hatches aboard ship, comprising an electric motor, a pin rack and pin wheel, with worm gearing for driving said pin wheel, driven by said motor for operating the door, means for completing the circuit through said motor from a distance, hand operated mechanism for completing the circuit through said motor in either direction and dominating the distant control, and means for automatically cutting off the control from said motor when the load on the motor exceeds a predetermined limit, and a signal circuit for making a signal at the distant point, with means for automatically closing said signal circuit when the door reaches the closed position, substantially as described.

10. An electric apparatus for the operation of watertight bulkhead doors and hatches aboard ship, comprising an electric motor, a pin rack and pin wheel, with worm gearing for driving said pin wheel, driven by said motor for operating the door, means for completing the circuit through said motor from a distance, hand operated mechanism for completing the circuit through said motor in either direction and dominating the distant control, and means for automatically cutting off the current from said motor and for breaking the circuit for the distant control when the load on the motor exceeds a predetermined limit, and a signal circuit for making a signal at the distant point, with means for automatically closing said signal circuit when the door reaches the closed position, substantially as described.

11. An electric apparatus for the operation of watertight bulkhead doors and hatches aboard ship, comprising an electric motor and worm gearing driven thereby for operating the door, means for completing the circuit through said motor from a distance, hand operated mechanism for completing the circuit through said motor in either direction, means for causing the hand operated mechanism to automatically dominate the distant control, and means for automatically cutting off the current from said motor when the load on the motor exceeds a predetermined limit, substantially as described.

12. An electric apparatus for the operation of watertight bulkhead doors and hatches aboard ship, comprising an electric motor and gearing driven thereby for operating the door, means for completing the circuit through said motor from a distance, hand operated mechanism for completing the circuit through said motor in either direction, means for causing the hand operated mechanism to automatically dominate the distant control, and means for automatically cutting off the current from said motor and for breaking the circuit for the distant control when the load on the motor exceeds a predetermined limit, substantially as described.

13. An electric apparatus for the operation of watertight bulkhead doors and hatches aboard ship, comprising an electric motor and gearing driven thereby for operating the door, means for completing the circuit through said motor from a distance. hand operated mechanism for completing the circuit through said motor in either direction, means for causing the hand operated mechanism to automatically dominate the distant control, and means for automatically cutting off the current from said motor and for breaking the circuit for the distant control when the load on the motor exceeds a predetermined limit, and a signal circuit for making a signal at the distant point, with means for automatically closing said signal circuit when the door reaches the closed position, substantially as described.

14. The combination with a bulkhead door, of a pin rack secured thereto, a pin wheel meshing in said rack, an electric motor, and gearing driven by said motor for driving said pin wheel, substantially as described.

15. The combination with a bulkhead door, of a pin rack secured thereto, a pin wheel meshing in said rack, an electric motor, and worm gearing driven by said motor for driving said pin wheel, substantially as described.

16. The combination with a bulkhead door, of a pin rack secured thereto, a pin wheel meshing in said rack, an electric motor and gearing driven by said motor for driving said pin wheel, with a cut out automatically operated by a member of said gearing for cutting off the electric current when the load on the motor exceeds a predetermined limit, substantially as described.

17. The combination with a bulkhead door, of a pin rack secured thereto, a pin wheel meshing in said rack, an electric motor and worm gearing driven by said motor for driving said pin wheel, with a cut out automatically operated by a member of said gearing for cutting off the electric current when the load on the motor exceeds a predetermined limit, substantially as described.

18. The combination with a bulkhead door, a pin rack secured thereto, a pin wheel engaging in said rack, a worm wheel driving said pin wheel, a worm engaging in said worm wheel, and means for driving said worm either by power or by hand as may be desired, substantially as described.

19. The combination with a bulkhead door, a pin rack secured thereto, a pin wheel engaging in said rack, a worm wheel, a worm engaging in said worm wheel, a worm shaft carrying said worm, and hand gearing for operating said worm shaft by hand, substantially as described.

20. The combination with a bulkhead door, a pin rack secured thereto, a pin wheel engaging in said rack, a worm wheel driving said pin wheel, a worm engaging in said worm wheel, a worm shaft carrying said worm, and an electric motor connected to said worm shaft for driving the same, substantially as described.

21. The combination with a bulkhead door, a pin rack secured thereto, a pin wheel engaging in said rack, a worm wheel driving said pin wheel, a worm engaging in said worm wheel, a worm shaft carrying said worm, hand gearing connected to said shaft near one end for turning the same by hand, and an electric motor connected to the other end of said shaft for driving the same by electricity, substantially as described.

22. The combination with a bulkhead door, of a pin rack secured thereto, a pin wheel meshing in said rack, means for driving said pin wheel by hand, and independent means for driving said pin wheel by electricity, substantially as described.

23. The combination with a bulkhead door, of a pin rack secured thereto at right angles to the face thereof, a pin wheel meshing in said rack, an electric motor and worm gearing driven by said motor for driving said pin wheel, substantially as described.

24. The combination with a bulkhead door, of a pin rack secured thereto at right angles to the face thereof, a pin wheel meshing in said rack, an electric motor and worm gearing driven by said motor for driving said pin wheel, and independent hand gearing for driving the pin wheel by hand when desired, substantially as described.

25. The combination with a bulkhead door, of a pin rack secured thereto at right angles to the face thereof, a pin wheel meshing in said rack, an electric motor and gearing driven by said motor for driving said pin wheel, with a cut out automatically operated by a member of said gearing for cutting off the electric current when the load on the motor exceeds a predetermined limit, and independent hand gearing for driving the pin wheel by hand when desired, substantially as described.

26. The combination with a bulkhead door, of a pin rack secured thereto at right angles to the face thereof, a pin wheel meshing in said rack, an electric motor and gearing driven by said motor for driving said pin wheel, with a cut out automatically operated by a member of said gearing for cutting off the electric current when the load on the motor exceeds a predetermined limit, substantially as described.

27. The combination with a bulkhead door, of a pin rack secured thereto at right angles to the face thereof, a pin wheel meshing in said rack, an electric motor and worm gearing driven by said motor for driving said pin wheel, with a cut out automatically operated by a member of said gearing for cutting off the electric current when the load on the motor exceeds a predetermined limit, substantially as described.

28. The combination with a bulkhead door, a pin rack secured thereto at right angles to the face thereof, a pin wheel engaging in said rack, a worm wheel driving said pin wheel, a worm engaging in said worm wheel, and means for driving said worm either by power or by hand as may be desired, substantially as described.

29. The combination with a bulkhead door, a pin rack secured thereto, a pin wheel engaging in said rack, a worm wheel driving said pin wheel, a worm engaging in said worm wheel, a worm shaft carrying said worm and adapted to slide axially, a stout spring normally holding said worm shaft in the initial position, an electric motor connected to said worm shaft for driving the same, and means controlled by the sliding of the worm shaft for cutting off the current from the motor when the load exceeds a predetermined limit, substantially as described.

30. The combination with a bulkhead door, a pin rack secured thereto, a pin wheel engaging in said rack, a worm wheel driving said pin wheel, a worm engaging in said worm wheel, a worm shaft carrying said worm and adapted to slide axially, a stout spring normally holding said worm shaft in the initial position, an electric motor connected to said worm shaft for driving the same, means for operating said electric motor either locally or from a distance, and means controlled by the sliding of the worm shaft for cutting off the current from the motor when the load exceeds a predetermined limit, substantially as described.

31. In an apparatus for operating sliding doors by electricity, the combination with a door and a rack secured thereto, of a power box secured across the door frame, gearing mounted in said power box for engaging said rack and moving the door, and an electric motor journaled in said power box and having the consequent pole of its field magnet integral with the cover of said box and removable therewith, substantially as described.

32. The combination with a sliding door provided with a pin rack secured on the face thereof, of a power box mounted across the door frame and provided with a combined worm bearing and oil trough rigidly held therein, a pin wheel meshing with said rack, a shaft for said pin wheel journaled in said power box, a worm wheel mounted on said shaft and inclosed in the power box, a worm mounted in said oil trough and engaging said worm wheel with mechanism mounted in said power box for operating said worm from either end thereof, substantially as described.

33. The combination with a sliding door provided with a pin rack secured on the face thereof, of a power box mounted across the door frame and provided with a combined worm bearing and oil trough rigidly held therein, a pin wheel meshing with said rack, a shaft for said pin wheel journaled in said power box, a worm wheel mounted on said shaft and inclosed in the power box, a worm mounted in said oil trough and engaging said worm wheel, with hand gears connected to said worm shaft near one end thereof for turning said shaft by hand when desired, and an electric motor mounted in said power box and connected to the other end of said worm shaft for turning the same by electricity, substantially as described.

34. In an apparatus for operating sliding doors by electricity, the combination with a door and a rack secured thereto, of a power box secured across the door frame, worm gearing mounted in said power box for engaging said rack and moving the door, and an electric motor for operating said worm gearing journaled in said power box and having the consequent pole of its field magnet integral with the cover of said box and removable therewith, substantially as described.

35. The combination with a sliding door provided with a pin rack secured on the face thereof, of a power box mounted across the door frame and provided with a removable cover, a pin wheel meshing with said rack, a shaft for said pin wheel journaled in said power box, a worm wheel mounted on said shaft and inclosed in the power box, a worm engaging said worm wheel, and an electric motor connected to said worm and journaled in said power box and having the consequent pole of its field magnet integral with the cover of said box and removable therewith, substantially as described.

36. The combination with a sliding door provided with a rack secured on the face thereof, of a power box mounted across the door frame and provided with a removable cover, a gear wheel meshing with said rack, a shaft for said wheel journaled in said power box, a worm wheel mounted on said shaft and inclosed in the power box, a worm engaging said worm wheel, and an electric motor connected to said worm and journaled in said power box and having the consequent pole of its field magnet integral with the cover of said box and removable therewith, substantially as described.

37. In an apparatus of the character described, the combination with a controller drum, of a solenoid and a solenoid plunger, means operated by said plunger for rocking the said drum, means for restoring said plunger to the initial position when not attracted by the said solenoid, and independent hand operated means for rocking said drum in either direction independent of said solenoid, with automatic means controlled by said hand operated means for locking said plunger against the action of said solenoid when said hand operated means is in operation, substantially as described.

38. In an apparatus of the character described, the combination with a controller drum, of a solenoid and a solenoid plunger, means operated by said plunger for rocking the said drum, means for restoring said plunger to the initial position when not attracted by the said solenoid, and independent hand operated means for rocking said drum in either direction independent of said solenoid, with a spring catch automatically released by the operation of the hand operating mechanism and holding said plunger against the action of said solenoid while said hand mechanism is being operated, substantially as described.

39. In an apparatus of the character described, the combination with a controller drum, of a spring impressed plunger normally adapted to hold said controller drum in the mid position, a solenoid for operating said plunger in one direction thus rocking said controller drum, hand operated mechanism for rocking said controller drum independent of said plunger, and automatic means operated by said hand operated mechanism for locking said plunger during the operation of said hand operated mechanism, substantially as described.

40. In an apparatus of the character described, the combination with a controller drum, of a spring impressed plunger normally adapted to hold said controller drum in the mid position, a solenoid for operating said plunger in one direction thus rocking said controller drum, hand operated mechanism for rocking said controller drum independent of said plunger, and automatic means operated by said hand operated mechanism for locking said plunger during the operation of said hand operated mechanism, comprising a spring impressed catch automatically controlled by the hand operating mechanism, and a lug carried by the said plunger engaging said catch, when released, substantially as described.

41. In an apparatus of the character described, the combination with a controller drum, of a solenoid and a solenoid plunger, means operated by said plunger for rocking the said drum, a double acting spring for restoring said plunger to the initial position when not attracted by said solenoid, and independent hand operated means for rocking said drum in either direction independent of said solenoid, substantially as described.

42. In an apparatus of the character described, the combination with a controller drum, of a solenoid and a solenoid plunger, means operated by said plunger for rocking the said drum, a double acting coil spring for restoring said plunger to the initial position when not attracted by the said solenoid, and independent hand operated means for rocking said drum in either direction independent of said solenoid, with automatic means controlled by said hand operated means for locking said plunger against the action of said solenoid when said hand operated means is in operation, substantially as described.

43. In an apparatus of the character described, the combination with a controller drum, of a solenoid and a solenoid plunger, means operated by said plunger for rocking the said drum, a double acting coil spring for restoring said plunger to the initial position when not attracted by the said solenoid, and independent hand operated means for rocking said drum in either direction independent of said solenoid, with a spring catch automatically released by the operation of the hand operating mechanism and holding said plunger against the action of said solenoid while said hand mechanism is being operated, substantially as described.

44. In an apparatus of the character described, the combination with a controller drum, of a plunger connected to said controller drum, a coil spring normally adapted to hold said plunger in the mid position, a solenoid for moving said plunger in one direction thus rocking said controller drum, hand operating mechanism for rocking said controller drum independently of said plunger, and automatic means operated by said hand operated mechanism for locking said plunger against the action of said solenoid during the operation of said hand operated mechanism, substantially as described.

45. In an apparatus of the character described, the combination with a controller drum, of a plunger connected to said controller drum, a coil spring normally adapted to hold said plunger in the mid position, a solenoid for moving said plunger in one direction thus rocking said controller drum, hand operating mechanism for rocking said controller drum independently of said plunger, and automatic means operated by said hand operated mechanism for locking said plunger against the action of said solenoid during the operation of said hand operated mechanism, comprising a spring impressed catch automatically controlled by the hand operating mechanism, and a lug carried by the said plunger engaging said catch, when released, substantially as described.

46. In an apparatus of the character described, the combination with a controller drum, of a solenoid and a solenoid plunger, means operated by said plunger for rocking the said drum, means for restoring said plunger to the initial position when not attracted by said solenoid, independent hand operated means for rocking said drum in either direction independently of said solenoid, and automatic means for restoring the hand operated means to the initial position after each operation, substantially as described.

47. In an apparatus of the character described, the combination with a controller drum, of a solenoid and a solenoid plunger, means operated by said plunger for rocking the said drum, means for restoring said plunger to the initial position when not attracted by the said solenoid, independent hand operated means for rocking said drum in either direction independently of said solenoid, with automatic means controlled by said hand operated means for locking said plunger against the action of said solenoid when said hand operated means is in operation, and automatic means for restoring the hand operated means to the initial position after each operation, substantially as described.

48. In an apparatus of the character described, the combination with a controller drum, of a solenoid and a solenoid plunger, means operated by said plunger for rocking the said drum, means for restoring said plunger to the initial position when not attracted by the said solenoid, independent hand operated means for rocking said drum in either direction independently of said solenoid, and automatic means for restoring the hand operated means to the initial position after each operation, with a spring catch automatically released by the operation of the hand operating mechanism and holding said plunger against the action of said solenoid while said hand mechanism is being operated, substantially as described.

49. In an apparatus of the character described, the combination with a controller drum, of a spring impressed plunger normally adapted to hold said controller drum in the mid position, a solenoid for operating said plunger in one direction thus rocking said controller drum, hand operated mechanism for rocking said controller drum independently of said plunger, and automatic means for restoring the hand operated means to the initial position after each operation, and automatic means operated by said hand operated mechanism for locking said plunger during the operation of said hand operated mechanism, substantially as described.

50. In an apparatus of the character described, the combination with a controller drum, of a spring impressed plunger normally adapted to hold said controller drum in the mid position, a solenoid for operating said plunger in one direction thus rocking said controller drum, hand operated mechanism for rocking said controller drum independently of said plunger, and automatic means for restoring the hand operated means to the initial position after each operation, and automatic means operated by said hand operated mechanism for locking said plunger during the operation of said hand operated mechanism, comprising a spring impressed catch automatically controlled by the hand operating mechanism, and a lug carried by the said plunger engaging said catch, when released, substantially as described.

51. An electric apparatus for the operation of water-tight bulkhead doors and hatches aboard ship, comprising an electric motor and gearing driven thereby for operating the door, a solenoid circuit, a solenoid and a controller drum for completing the circuit through said motor from a distance, and hand operated mechanism for completing the circuit through said motor in either direction and dominating the solenoid control, comprising a control shaft, and a system of levers operated thereby connected to the controller drum, with a spring adapted to return the system of levers to the initial position, substantially as described.

52. An electric apparatus for the operation of water-tight bulkhead doors and hatches aboard ship, comprising an electric motor and gearing driven thereby for operating the door, a solenoid circuit, a solenoid, and a controller operated thereby for completing the circuit through said motor from a distance, hand operated mechanism for completing the circuit through said motor in either direction and dominating the solenoid control, comprising a control shaft, and a system of levers operated thereby connected to the controller drum, with a spring adapted to return the system of levers to the initial position, and means for automatically cutting off the current from said motor when the load on the motor exceeds a predetermined limit, substantially as described.

53. An electric apparatus for the operation of water-tight bulkhead doors and hatches aboard ship, comprising an electric motor and gearing driven thereby for operating the door, a solenoid circuit, a solenoid, and a controller operated thereby for completing the circuit through said motor from a distance, hand operated mechanism for completing the circuit through said motor in either direction and dominating the solenoid control, comprising a control shaft, and a system of levers operated thereby connected to the controller drum, with a spring adapted to return the system of levers to the initial position, means for automatically cutting off the current from said motor when the load on the motor exceeds a predetermined limit, and a signal circuit for making a signal at the distant point, with means for automatically closing said signal circuit when the door reaches the closed position, substantially as described.

54. An electric apparatus for the operation of water-tight bulkhead doors and hatches aboard ship, comprising an electric motor and gearing driven thereby for operating the door, a solenoid circuit, a solenoid, and a controller operated thereby for completing the circuit through said motor from a distance, hand operated mechanism for completing the circuit through said motor in either direction and dominating the solenoid control, comprising a control shaft, and a system of levers operated thereby connected to the controller drum, with a spring adapted to return the system of levers to the initial position, and means for automatically cutting off the current from said motor and for breaking the circuit through the solenoid when the load on the motor exceeds a predetermined limit.

55. In an apparatus of the character described, the combination with a controller drum, of a solenoid and a solenoid plunger, means operated by said plunger for rocking the said drum, a double acting spring for restoring said plunger to the initial position when not attracted by said solenoid and independent hand operated means for rocking said drum in either direction independently of said solenoid, with automatic means for interlocking said plunger with said hand operated means, thus holding said plunger against the action of said solenoid, substantially as described.

56. In an apparatus of the character described, the combination with a controller drum, of a solenoid and a solenoid plunger, means operated by said plunger for rocking the said drum, means for restoring said plunger to the initial position when not attracted by said solenoid, independent hand operated means for rocking said drum in either direction independently of said solenoid, comprising a control shaft, and a system of levers operated thereby, and automatic means for restoring the hand operated means to the initial position after each operation, substantially as described.

57. In an apparatus of the character desscribed, the combination with a controller drum, of a solenoid and a solenoid plunger, means operated by said plunger for rocking the said drum, means for restoring said plunger to the initial position when not attracted by said solenoid, independent hand operated means for rocking said drum in either direction independently of said solenoid, comprising a control shaft, and a system of levers operated thereby, and automatic means for restoring the hand operated means to the initial position after each operation, comprising a spring impressed lever having arms coacting with said system of levers, and restoring them to the initial position when released.

58. In an apparatus of the character described, the combination with a controller drum, of a solenoid and a solenoid plunger, means operated by said plunger for rocking the said drum, means for restoring said plunger to the initial position when not attracted by the said solenoid, independent hand operated means for rocking said drum in either direction independently of said solenoid, with automatic means controlled by said hand operated means for locking said plunger against the action of said solenoid when said hand operated means is in operation, and automatic means for restoring the hand operated means to the initial position after each operation, comprising a spring impressed lever having arms coacting with said system of levers, and restoring them to the initial position when released, substantially as described.

59. In an apparatus of the character described, the combination with a controller drum, of a solenoid and a solenoid plunger, means operated by said plunger for rocking the said drum, means for restoring said plunger to the initial position when not attracted by the said solenoid, independent hand operated means for rocking said drum in either direction independently of said solenoid, automatic means for restoring the hand operated means to the initial position after each operation, comprising a spring impressed lever having arms coacting with said system of levers, and restoring them to the initial position when released, with a spring catch automatically released by the operation of the hand operating mechanism and holding said plunger against the action of said solenoid while said hand mechanism is being operated, substantially as described.

60. In an apparatus of the character described, the combination with a controller drum, of a spring impressed plunger normally adapted to hold said controller drum in the mid position, a solenoid for operating said plunger in one direction thus rocking said controller drum, hand operated mechanism for rocking said controller drum independently of said plunger, automatic means for restoring the hand operated means to the initial position after each operation, comprising a spring impressed lever having arms coacting with said system of levers, and restoring them to the initial position when released, and means automatically operated by said hand operated mechanism for locking said plunger during the operation of said hand operated mechanism, substantially as described.

61. In an apparatus of the character described, the combination with a controller drum, of a spring impressed plunger normally adapted to hold said controller drum in the mid position, a solenoid for operating said plunger in one direction thus rocking said controller drum, hand operated mechanism for rocking said controller drum independently of said plunger, a spring and mechanism operated thereby for restoring the hand operated means to the initial position after each operation, and automatic means operated by said hand operated mechanism for locking said plunger during the operation of said hand operated mechanism, comprising a spring impressed catch automatically controlled by the hand operating mechanism, and a lug carried by the said plunger engaging said catch, when released, substantially as described.

62. An electric apparatus for the operation of water-tight bulkhead doors and hatches aboard ship, comprising an electric motor and gearing driven thereby for operating the door, a solenoid circuit, a solenoid and a controller drum for completing the circuit through said motor from a distance, and hand operated mechanism for completing the circuit through said motor in either direction and dominating the solenoid control, comprising a control shaft, and a system of levers operated thereby connected to the controller drum, and a spring impressed lever adapted to return the system of levers to the initial position, substantially as described.

63. An electric apparatus for the operation of water tight bulkhead doors and hatches aboard ship, comprising an electric motor, a controller drum with means for normally restoring the same to the initial position, gearing driven by said motor for operating the door, means for completing the circuit through said motor, and means for automatically breaking said circuit when the load on the motor exceeds a predetermined limit, comprising a spring impressed shaft connected to or included in said gearing and yielding when the thrust thereon exceeds a predetermined limit, a lever connected to said shaft, and means operated by the said lever for releasing said controller drum, substantially as described.

64. An electric apparatus for the operation of water tight bulkhead doors and hatches aboard ship, comprising an electric motor, a controller drum, and a spring impressed plunger connected to the controller drum, a solenoid adapted to act on said plunger, gearing driven by said motor for operating the door, means for completing the circuit through said solenoid thus operating said controller drum and closing the circuit through said motor, and means for automatically breaking the circuit both through said motor and through said solenoid when the load on the motor exceeds a predetermined limit, comprising a spring impressed shaft connected to or included in said gearing and adapted to yield when the thrust thereon exceeds a predetermined limit, a lever connected to said shaft, and means operated by said lever for releasing said controller drum and for breaking the current through said solenoid, substantially as described.

65. An electric apparatus for the operation of watertight bulkhead doors and hatches aboard ship, comprising an electric motor, a controller drum with means for normally restoring the same to the initial position, gearing driven by said motor for operating the door, means for rocking said controller drum thus completing the circuit through said motor, and means for automatically breaking said circuit when the load on the motor exceeds a predetermined limit, comprising a spring impressed member of said gearing adapted to yield when the thrust thereon exceeds a predetermined limit, a lever connected to said member, and means operated by the said lever for releasing said controller drum, substantially as described.

66. An electric apparatus for the operation of watertight bulkhead doors and hatches aboard ship, comprising an electric motor, a controller drum with means for normally restoring the same to the initial position, means for rocking said controller drum either from a distance or locally, thus completing the circuit through said motor, gearing driven by said motor for operating the door, and means for automatically breaking the circuit through the motor when the load on the motor exceeds a predetermined limit, comprising a spring impressed member of said gearing adapted to yield when the thrust thereon exceeds a predetermined limit, a lever connected to said member, and means operated by the said lever for releasing said controller drum independently of the local or distant control, substantially as described.

67. An electric apparatus for the operation of watertight bulkhead doors and hatches aboard ship, comprising an electric motor, a controller drum, and a spring impressed plunger connected to the controller drum, a solenoid adapted to act on said plunger, gearing driven by said motor for operating the door, means for completing the circuit through said solenoid thus operating said controller drum and closing the circuit through said motor, and means for automatically breaking the circuit through said solenoid when the load on the motor exceeds a predetermined limit, comprising a spring impressed member of said gearing adapted to yield when the thrust thereon exceeds a predetermined limit, a lever connected to said member, and means operated by said lever for releasing said controller drum and for breaking the current through said solenoid, substantially as described.

68. An electric apparatus for the operation of watertight bulkhead doors and hatches aboard ship, comprising an electric motor, a controller drum, and a spring impressed plunger connected to the controller drum, a solenoid adapted to act on said plunger, means independent of said solenoid for rocking said controller drum, gearing driven by said motor for operating the door, means for completing the circuit through said solenoid thus operating said controller drum and closing the circuit through said motor, and means for automatically breaking the circuit both through said motor and through said solenoid when the load on the motor exceeds a predetermined limit, comprising a spring impressed member of said gearing adapted to yield when the thrust thereon exceeds a predetermined limit, a lever connected to said member, and means operated by said lever for releasing said controller drum and for breaking the current through said solenoid, substantially as described.

69. An electric apparatus for the operation of watertight bulkhead doors and hatches aboard ship, comprising an electric motor and gearing driven thereby for operating the door, a solenoid circuit, a solenoid, and a controller operated thereby for completing the circuit through said motor from a distance, with means for automatically restoring the controller to the initial position when released, hand operated mechanism for operating said controller and thus completing the circuit through said motor in either direction and dominating the solenoid control, and means for automatically cutting off the current from said motor and for breaking the circuit through the solenoid when the load on the motor exceeds a predetermined limit, comprising a spring impressed member of said gearing adapted to yield when the thrust thereon exceeds a predetermined limit, a lever connected to said member, and means operated by said lever for releasing said controller drum and for breaking the current through said solenoid, substantially as described.

70. An electric apparatus for the operation of watertight bulkhead doors and hatches aboard ship, comprising an electric motor and gearing driven thereby for operating the door, a solenoid circuit, a solenoid, and a controller operated thereby for completing the circuit through said motor from a distance, with means for automatically restoring the controller to the initial position when released, hand operated mechanism for operating said controller and thus completing the circuit through said motor in either direction and dominating the solenoid control, and means for automatically cutting off the current from said motor when the load on the motor exceeds a predetermined limit, comprising a spring impressed shaft included in said gearing and adapted to yield when the load on the motor exceeds a predetermined limit, a lever connected to said shaft, and means operated by said lever for releasing the controller, substantially as described.

71. In an apparatus of the character described, the combination with a controller drum, of a solenoid and a solenoid plunger, means operated by said plunger for rocking the said drum, means for restoring said plunger to the initial position when not attracted by said solenoid, independent hand operated means for rocking said drum in either direction, independently of said solenoid, automatic means for restoring the hand operated means to the initial position after each operation, and mechanism for automatically releasing said controller drum from either the hand control or the solenoid control, when the load on the motor exceeds a predetermined limit, substantially as described.

72. In an apparatus of the character described, the combination with a controller drum, of a solenoid, means operated by said solenoid for rocking the said drum, means for automatically restoring said drum to the initial position, independent hand operated means for rocking said drum in either direction independently of said solenoid, automatic means for restoring the hand operated means to the initial position after each operation, and mechanism for automatically releasing said controller drum from either the hand control or the solenoid control, when the load on the motor exceeds a predetermined limit, substantially as described.

73. In an apparatus of the character described, the combination with a controller drum, of a solenoid and a solenoid plunger, means operated by said plunger for rocking the said drum, means for restoring said plunger to the initial position when not attracted by the said solenoid, hand operated means for rocking said drum in either direction independently of said solenoid, with automatic means controlled by said hand operated means for locking said plunger against the action of said solenoid when said hand operated means is in operation, and automatic means for restoring the hand operated means to the initial position after each operation, comprising a spring impressed lever having arms coacting with said system of levers, and restoring them to the initial position when released, and mechanism for automatically releasing said controller drum from either the hand control or the solenoid control, when the load on the motor exceeds a predetermined limit, substantially as described.

74. In an apparatus of the character described, the combination with a controller drum, of a solenoid and a solenoid plunger, means operated by said plunger for rocking the said drum, means for restoring said plunger to the initial position when not attracted by the said solenoid, hand operated means for rocking said drum in either direction independently of said solenoid, automatic means for restoring the hand operated means to the initial position after each operation, comprising a spring impressed lever having arms coacting with said system of levers, and restoring them to the initial position when released, with a spring catch automatically released by the operation of the hand operating mechanism and holding said plunger against the action of said solenoid while said hand mechanism is being operated, and mechanism for automatically releasing said controller drum from either the hand control or the solenoid control, when the load on the motor exceeds a predetermined limit, substantially as described.

75. In an apparatus of the character described, the combination with a controller drum, of a spring impressed plunger normally adapted to hold said controller drum in the mid position, a solenoid for operating said plunger in one direction thus rocking said controller drum, hand operated mechanism for rocking said controller drum independently of said plunger, automatic means for restoring the hand operated means to the initial position after each operation comprising a spring impressed lever having arms coacting with said system of levers, and restoring them to the initial position when released, means automatically operated by said hand operated mechanism for locking said plunger during the operation of said hand operated mechanism, and mechanism for automatically releasing said controller drum from either the hand control or the solenoid control, when the load on the motor exceeds a predetermined limit, substantially as described.

76. The combination with a bulkhead door or hatch and means for operating the same electrically from a distant point, of a signal located at the distant point, means for operating said signal consisting of an electric circuit leading from the distant point to the door, a bell crank pivoted to the door frame and adapted to open and close the circuit to the signal, and an arm carried by the door and adapted to strike said bell crank and close said circuit when the door reaches the closed and locked position, substantially as described.

77. The combination with a bulkhead door or hatch and means for operating the same electrically from a distant point, of a signal located at the distant point, means for operating said signal consisting of an electric circuit leading from the distant point to the door, a bell crank pivoted to the door frame and adapted to open and close the circuit to the signal, and an arm carried by the door and adapted to strike said bell crank and close said circuit when the door reaches the closed and locked position, with a spring normally throwing the said bell crank to the open circuit position when the door is raised from its seat, substantially as described.

78. The combination with a bulkhead door or hatch and means for operating the same electrically from a distant point, of a signal located at the distant point, means for operating said signal consisting of an electric circuit leading from the distant point to the door, a bell crank pivoted to the door frame and adapted to open and close the circuit to the signal, and an arm carried by the door and adapted to strike said bell crank and close said circuit when the door reaches the closed and locked position, and a coil spring mounted on the pivot of said bell crank lever and adapted to throw the same to the open circuit position when the door is lifted from its seat, substantially as described.

In testimony whereof, I affix my signature, in presence of two witnesses.

ROBERT H. KIRK.

Witnesses:
M. M. O'CONNOR,
E. M. BRANDT.